(12) United States Patent
Ke et al.

(10) Patent No.: US 12,095,723 B2
(45) Date of Patent: Sep. 17, 2024

(54) DOMAIN NAME ADDRESS OBTAINING METHOD AND DEVICE

(71) Applicant: VIVO MOBILE COMMUNICATION CO., LTD., Dongguan (CN)

(72) Inventors: Xiaowan Ke, Dongguan (CN); Mengxiang Wu, Dongguan (CN); Shounian Zhang, Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 18/357,813

(22) Filed: Jul. 24, 2023

(65) Prior Publication Data

US 2024/0022540 A1 Jan. 18, 2024

Related U.S. Application Data

(63) Continuation of application No. 17/677,613, filed on Feb. 22, 2022, now Pat. No. 11,757,828, and a (Continued)

(30) Foreign Application Priority Data

Aug. 23, 2019 (CN) .......................... 201910786051.4

(51) Int. Cl.
*H04L 29/08* (2006.01)
*H04L 61/4511* (2022.01)
(Continued)

(52) U.S. Cl.
CPC ...... *H04L 61/4511* (2022.05); *H04L 61/5038* (2022.05); *H04L 61/5084* (2022.05); *H04L 67/01* (2022.05); *H04W 76/11* (2018.02)

(58) Field of Classification Search
CPC . H04L 61/4511; H04L 67/01; H04L 61/5038; H04L 61/5084; H04W 76/11
(Continued)

(56) References Cited

U.S. PATENT DOCUMENTS

| 2002/0010798 | A1* | 1/2002 | Ben-Shaul ............ H04L 67/52 707/E17.116 |
| 2009/0274114 | A1 | 11/2009 | Jun et al. |

(Continued)

FOREIGN PATENT DOCUMENTS

| CN | 102148752 A | 8/2011 |
| CN | 102572014 A | 7/2012 |

(Continued)

OTHER PUBLICATIONS

International Search Report and Written Opinion on the International Patent Application No. PCT/CN2020/110468 issued by the International Searching Authority on Nov. 26, 2020.
(Continued)

*Primary Examiner* — Jude Jean Gilles
(74) *Attorney, Agent, or Firm* — IP & T GROUP LLP

(57) ABSTRACT

A domain name address obtaining method includes: in a case that a first condition is met, performing a related operation of refreshing a domain name address record to obtain an address of a second server. The second server is an edge server or public server used to exchange data with the first communications device, and the first condition includes: a first indication being received in a PDU session modification process. The first indication is used to instruct to trigger domain name address query; the domain name address record is a mapping relationship between a server domain name and a server address.

20 Claims, 14 Drawing Sheets

Related U.S. Application Data continuation of application No. PCT/CN2020/110468, filed on Aug. 21, 2020.

(51) Int. Cl.
*H04L 61/5038* (2022.01)
*H04L 61/5084* (2022.01)
*H04L 67/01* (2022.01)
*H04W 76/11* (2018.01)

(58) Field of Classification Search
USPC .......................................................... 709/203
See application file for complete search history.

(56) References Cited

U.S. PATENT DOCUMENTS

| | | |
|---|---|---|
| 2014/0359041 A1 | 12/2014 | Bai |
| 2017/0339101 A1 | 11/2017 | Suga |
| 2018/0278688 A1* | 9/2018 | Gal ..................... H04L 61/4511 |
| 2019/0191471 A1 | 6/2019 | Yoshikawa et al. |
| 2021/0400535 A1* | 12/2021 | Hoewisch ......... H04W 28/0992 |

FOREIGN PATENT DOCUMENTS

| | | |
|---|---|---|
| CN | 102611763 A | 7/2012 |
| CN | 107743307 A | 2/2018 |
| CN | 107770815 A | 2/2018 |
| CN | 109462668 A | 3/2019 |
| CN | 109547585 A | 3/2019 |
| CN | 109640319 A | 4/2019 |
| CN | 109788078 A | 5/2019 |

OTHER PUBLICATIONS

First Office Action on the Chinese Patent Application No. 201910786051.4 issued by the Chinese Patent Office on Mar. 23, 2021.
Second Office Action on the Chinese Patent Application No. 201910786051.4 issued by the Chinese Patent Office on Oct. 18, 2021.
Third Office Action on the Chinese Patent Application No. 201910786051.4 issued by the Chinese Patent Office on Aug. 18, 2022.
Solution: IP address allocation, SA WG2 Meeting #126, S2-182477, Feb. 26-Mar. 2, 2018, pp. 1-5, Huawei and Hisilicon, Montreal, Canada.
Discussion on SA2 Edge computing study, S2-1901832, Huawei and Intel.

* cited by examiner

DOMAIN NAME ADDRESS OBTAINING METHOD AND DEVICE

CROSS-REFERENCE TO RELATED APPLICATIONS

This application is a Continuation Application of U.S. application Ser. No. 17/677,613, which is a U.S. national phase application of a PCT Application No. PCT/CN2020/110468 filed on Aug. 21, 2020, which claims priority to Chinese Patent Application No. 201910786051.4 filed on Aug. 23, 2019, which are incorporated herein by reference in their entirety.

TECHNICAL FIELD

Embodiments of the present disclosure relate to the field of communications technologies, and in particular, to a domain name address obtaining method and a device.

BACKGROUND

Currently, if a minimum delay is expected to be implemented in mobile edge computing (MEC), an edge cloud needs to be deployed on a radio access network (RAN) network element side. However, the closer to the RAN network element, the smaller a service range of the edge cloud. As a terminal (for example, user equipment (UE) moves and is handed over, handover of the edge cloud and relocation of an edge server may occur.

Currently, when a service flow of the terminal is migrated between edge servers, service continuity of the service flow cannot be met, and a data loss or a delay process exists.

SUMMARY

Embodiments of the present disclosure provide a domain name address obtaining method and a device.

According to a first aspect, an embodiment of the present disclosure provides a domain name address obtaining method, applied to a first communications device and including:
  in a case that a first condition is met, performing a related operation of refreshing a domain name address record, where the first condition includes at least one of the following:
  confirming that an obtained DNS address is changed;
  occurring a PDU session relocation;
  confirming that an obtained IP address is changed;
  a first DNN being no longer available;
  a second DNN being available;
  a terminal moving from a first area to a second area;
  the terminal moving out of the first area;
  the terminal moving to the second area;
  a first indication being received;
  the terminal being handed over; or the terminal being in a connected state, where
  the first area includes at least one of the following: a serving area of a first local service, a serving area of a non-local service, or an available area of the first DNN; and
  the second area includes at least one of the following: a serving area of a second local service, a serving area of a non-local service, or an available area of the second DNN.

According to a second aspect, an embodiment of the present disclosure further provides a domain name address obtaining method, applied to a second communications device and including:
  obtaining first information, where the first information includes at least one of the following: an address of a first DNS or a first indication, where the first indication is used to instruct to trigger domain name address query; and
  performing a first operation based on the first information.

According to a third aspect, an embodiment of the present disclosure further provides a domain name address obtaining method, applied to a third communications device and including:
  obtaining location information of a terminal; and
  determining first information and/or updating DNS information of the terminal based on the location information of the terminal, where the first information includes at least one of the following: an address of a first DNS or a first indication, where the first indication is used to instruct to trigger domain name address query.

According to a fourth aspect, an embodiment of the present disclosure further provides a domain name address obtaining method, applied to a fourth communications device and including:
  obtaining second information; and
  determining, based on the second information, a DNS queried by using a domain name, where
  the second information includes at least one of the following: DNS information, description information of a service flow using a first DNS, description information of a service flow using a second DNS, description information of a service flow using a local DNS, description information of a service flow using a non-local DNS, an address of a DNS of a service flow, or a DNS type of the DNS of the service flow.

According to a fifth aspect, an embodiment of the present disclosure further provides a domain name address obtaining method, applied to a fifth communications device and including:
  determining second information and/or third information; and
  sending the second information and/or the third information, where
  the second information includes at least one of the following: DNS information, description information of a service flow using a first DNS, description information of a service flow using a second DNS, description information of a service flow using a local DNS, description information of a service flow using a non-local DNS, an address of a DNS of a service flow, or a DNS type of the DNS of the service flow; and
  the third information includes at least one of the following: an address of a second local DNS; a second indication, where the second indication is used to instruct to delete an address of a first local DNS; a third indication, where the third indication is used to instruct to trigger domain name address query; or an address of a third DNS.

According to a sixth aspect, an embodiment of the present disclosure further provides a domain name address obtaining method, applied to a sixth communications device and including:
  obtaining third information, where the third information includes at least one of the following: an address of a second local DNS; a second indication, where the second indication is used to instruct to delete an address of a first local DNS; a third indication, where the third indication is used to instruct to trigger domain name address query; or an address of a third DNS; and performing a second operation based on the third information.

According to a seventh aspect, an embodiment of the present disclosure further provides a method for supporting control of an edge service, applied to an eighth communications device and including:

determining information of an edge service; and sending the information of the edge service, where the information of the edge service includes at least one of the following: information of an LADN or a terminal policy related to a service flow.

According to an eighth aspect, an embodiment of the present disclosure further provides a first communications device, including:

a first processing module, configured to: in a case that a first condition is met, perform a related operation of refreshing a domain name address record, where the first condition includes at least one of the following:

confirming that an obtained DNS address is changed;

occurring a PDU session relocation;

confirming that an obtained IP address is changed;

a first DNN being no longer available;

a second DNN being available;

a terminal moving from a first area to a second area;

the terminal moving out of the first area;

the terminal moving to the second area;

a first indication being received, where the first indication is used to instruct to trigger domain name address query;

the terminal being handed over; or the terminal being in a connected state, where the first area includes at least one of the following: a serving area of a first local service, a serving area of a non-local service, or an available area of the first DNN; and the second area may include at least one of the following: a serving area of a second local service, a serving area of a non-local service, or an available area of the second DNN.

According to a ninth aspect, an embodiment of the present disclosure further provides a second communications device, including:

a first obtaining module, configured to obtain first information, where the first information includes at least one of the following: an address of a first DNS or a first indication, where the first indication is used to instruct to trigger domain name address query; and a second processing module, configured to perform a first operation based on the first information.

According to a tenth aspect, an embodiment of the present disclosure further provides a third communications device, including:

a second obtaining module, configured to obtain location information of a terminal;

and a third processing module, configured to determine first information and/or update DNS information of the terminal based on the location information of the terminal, where the first information includes at least one of the following: an address of a first DNS or a first indication, where the first indication is used to instruct to trigger domain name address query.

According to an eleventh aspect, an embodiment of the present disclosure further provides a fourth communications device, including:

a third obtaining module, configured to obtain second information; and a fourth processing module, configured to determine, based on the second information, a DNS queried by using a domain name, where the second information includes at least one of the following: DNS information, description information of a service flow using a first DNS, description information of a service flow using a second DNS, description information of a service flow using a local DNS, description information of a service flow using a non-local DNS, an address of a DNS of a service flow, or a DNS type of the DNS of the service flow.

According to a twelfth aspect, an embodiment of the present disclosure further provides a fifth communications device, including:

a first determining module, configured to determine second information and/or third information; and a first sending module, configured to send the second information and/or the third information, where the second information includes at least one of the following: DNS information, description information of a service flow using a first DNS, description information of a service flow using a second DNS, description information of a service flow using a local DNS, description information of a service flow using a non-local DNS, an address of a DNS of a service flow, or a DNS type of the DNS of the service flow; and the third information includes at least one of the following: an address of a second local DNS; a second indication, where the second indication is used to instruct to delete an address of a first local DNS; a third indication, where the third indication is used to instruct to trigger domain name address query; or an address of a third DNS.

According to a thirteenth aspect, an embodiment of the present disclosure further provides a sixth communications device, including:

a fourth obtaining module, configured to obtain third information, where the third information includes at least one of the following: an address of a second local DNS; a second indication, where the second indication is used to instruct to delete an address of a first local DNS; a third indication, where the third indication is used to instruct to trigger domain name address query; or an address of a third DNS; and a fifth processing module, configured to perform a second operation based on the third information.

According to a fourteenth aspect, an embodiment of the present disclosure further provides an eighth communications device, including:

a second determining module, configured to determine information of an edge service; and a second sending module, configured to send the information of the edge service, where the information of the edge service includes at least one of the following: information of an LADN or a terminal policy related to a service flow.

According to a fifteenth aspect, an embodiment of the present disclosure further provides a communications device, including a processor, a memory, and a program that is stored in the memory and executable on the processor, where when the program is executed by the processor, the steps of the foregoing method are implemented.

According to a sixteenth aspect, an embodiment of the present disclosure further provides a non-transitory computer-readable storage medium, where the non-transitory computer-readable storage medium stores a computer program, and when the computer program is executed by a processor, the steps of the foregoing method are implemented.

BRIEF DESCRIPTION OF DRAWINGS

It becomes clear for persons skilled in the art to learn various other advantages and benefits by reading detailed description of the following preferred implementations. Accompanying drawings are merely used for showing the preferred implementations, but not considered as a limitation on the present disclosure. In all accompanying drawings, a same reference symbol is used to indicate a same part. In the accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

Figure 1:
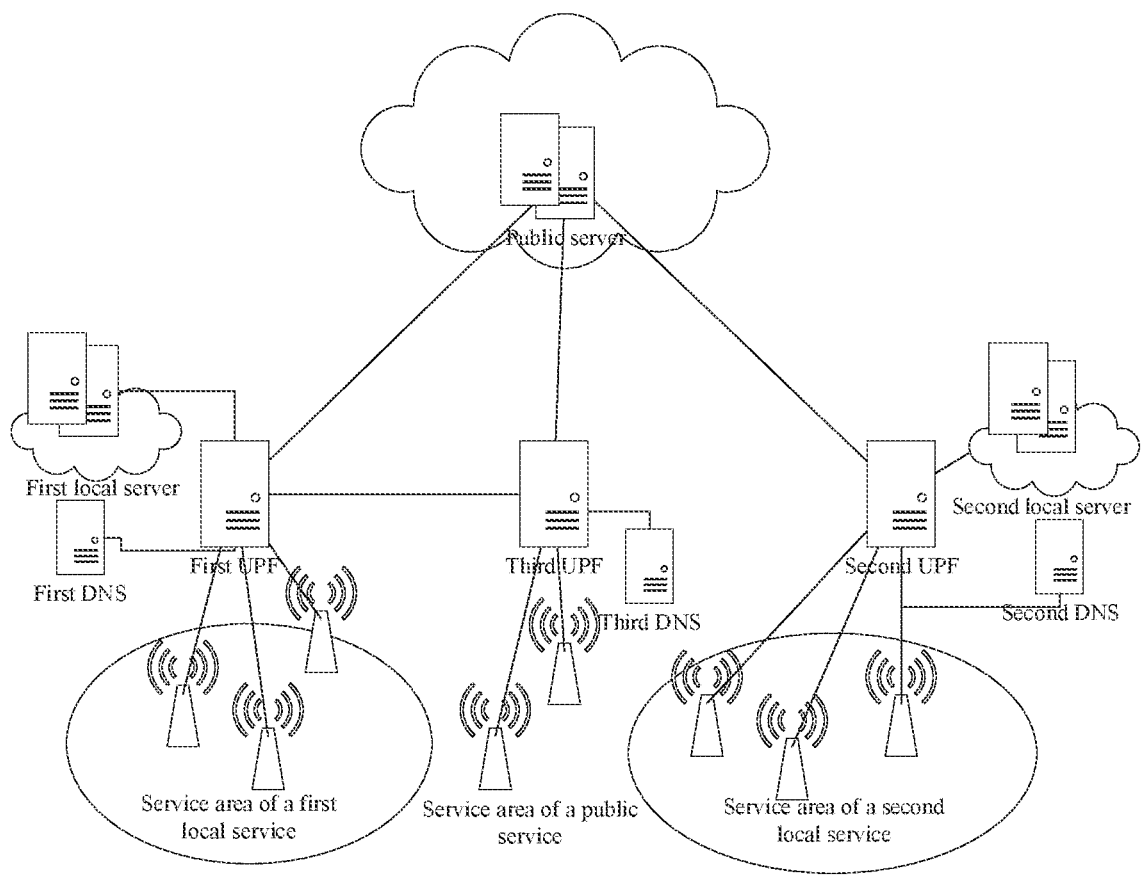
FIG. 1 is a schematic diagram of message transmission.

Referring to FIG. 1, when UE is in a service area of a first local service, a first local server may serve the UE. When the UE moves from the service area of the first local service to a service area of a public service, a public server may serve the UE. When the UE moves from the service area of the public service to a service area of a second local service, a second local server may serve the UE. That is, as the UE moves, an edge server needs to be changed, or an application of the UE is not informed when the UE is handed over from the edge server to a public server.

Figure 2:
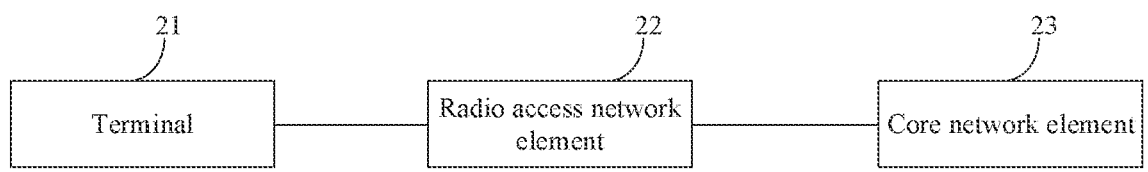
FIG. 2 is a schematic architecture diagram of a wireless communications system according to an embodiment of the present disclosure.

Referring to FIG. 2, FIG. 2 is a schematic architecture diagram of a wireless communications system to which embodiments of the present disclosure can be applied. As shown in FIG. 2, the system includes a terminal 21, a radio access network (RAN) element 22, and a core network (CN) element 23. The terminal 21 may be a terminal side device such as UE, for example, a mobile phone, a tablet personal computer, a laptop computer, a personal digital assistant (PDA), a mobile Internet device (MID), or a wearable device. It should be noted that a specific type of the terminal 21 is not limited in the embodiments of the present disclosure.

For the related art, the following problems are introduced.

I. Problem During Initial DNS Query

When an application client on UE needs to access a server of an application, an address of the server first needs to be queried based on a domain name (for example, a fully qualified domain name (FQDN) or a uniform resource identifier (URI)). Because of deployment of an edge cloud and an edge server, one domain name corresponds to addresses of a plurality of servers.

To obtain correctly the server address corresponding to the domain name, a method implemented in the related art is DNS interception. That is, after a DNS queries an address of a public server based on a domain name of the UE, the DNS replaces the address of the public server with an address of a local server and then returns the address to the UE. The UE accesses different user plane functions (UPF) in different locations, and different addresses of the local server are replaced. This method is based on a local server confirmed by using an internet protocol address (IP) network segment of the UE. An operator needs to plan a mapping between an area and the IP network segment well. A UPF egress at a municipal level is well planned, but a UPF egress at a RAN level is too difficult.

II. Problem During Subsequent DNS Query after Movement of the UE

In current DNS implementation, there are the following cases:
(1) The application re-queries a DNS address in each request.
(2) After finding a server address corresponding to a domain name, the terminal UE or the application stores the server address, and does not query the domain name for a long time (for example, 2 hours).

A content delivery network (CDN) of an existing network may be analogous to MEC. In a current CDN mode, the terminal UE does not actively change an address of a CDN server, but changes the address only after an application triggers DNS query or a domain name record expires. For example, a user moves from a city A to a city B. Before DNS re-query, the terminal UE is still connected to a server of Shenzhen through a gateway of Dongguan based on domain name record, and a transmission delay is very long during an interval of the DNS re-query. This cannot meet a low-delay service requirement of MEC.

As the UE moves, the edge server needs to be changed, or an application of the UE is not informed when the UE is handed over from the edge server to a public server.

For case (2), after the server changes, the UE determines that connection to the old server is unavailable only after a retry timeout, and then initiates DNS query again. In this process, continuity cannot be ensured and data is lost. For an edge cloud with a larger coverage, for example, an edge cloud at a municipal level, there is only impact from a municipal edge, and a handover frequency between clouds is relatively small. However, for an edge cloud with a smaller coverage, a handover frequency between edge clouds greatly increases, and impact of not being able to support continuity is greater.

For the problem during initial DNS query: A local DNS needs to be provided for the UE to replace a public DNS. Each edge cloud corresponds to one local DNS, and a server address corresponding to a domain name stored in each local DNS is an edge server address in a local edge cloud. Therefore, a same domain name obtains different addresses through query from different local DNSs.

For the problem during subsequent DNS query after movement of the UE, with a moving location of the UE, a session management function (SMF) may continuously change the local DNS, and send the local DNS to the UE by using a protocol configuration option (PCO)/an extended protocol configuration option (ePCO). When the UE moves out of a service range of an edge cloud and no edge cloud exists in a target area, the public DNS is configured for the UE, and the UE actively updates a previously queried domain name record during DNS update. Disadvantage: The domain name record needs to be updated from an application that does not support MEC. Consequently, large overheads are caused.

In some embodiments of the present disclosure, the SMF configures a local DNS for the UE, and an application supporting MEC may obtain an address of the edge server. When an application that does not support MEC initiates a domain name request to the Local DNS, the local DNS may obtain an address of a public server in an iterative manner. A UE policy (Policy) is used to distinguish an MEC application from a non-MEC application. During DNS change, a domain name query record of a MEC-related service flow is actively refreshed.

In some other embodiments of the present disclosure, the SMF configures a local DNS and a public DNS for the UE.

The UE policy is used to distinguish an MEC application from a non-MEC application. The MEC application queries a domain name through the local DNS and the non-MEC application queries a domain name through the public DNS. As the UE moves, the local DNS continuously changes. The DNS change triggers the UE to re-query a domain name based on a stored domain name record. Therefore, continuity is supported, and a domain name record of the non-MEC application is not affected.

When the local DNS is deleted, an application is to re-query, through the public DNS in the UE, a domain name that is queried through the local DNS.

In some other embodiments of the present disclosure, an edge enable client generates an address-based domain name or sends an actual domain name and address, and sends the address-based domain name or the actual domain name and address to a DNS in an edge enabler server by using the Hyper Text Transfer Protocol (HTTP). The DNS returns a server address based on the location-based domain name. An area range of MEC is configured for the UE (for example, a local area data network (LADN)). When the UE moves out of the area range, the edge enabler client actively refreshes a DNS record.

In an optional embodiment of the present disclosure, a terminal local configuration (UE Local Configuration) is information about an application associated with a PDU session or non-seamless offload in a mobile terminal (MT) and terminal equipment (TE). For example, the terminal local configuration may include an operator-specific configuration (for example, an S-NSSAI provided by an operator) or a specific parameter used to set a PDU session or an end-user configuration for a specific application program.

In an optional embodiment of the present disclosure, a domain name address record is a mapping relationship between a domain name and a server address. The domain name address record may also be embodied as a domain name address query record, a domain name address query result record, or the like.

In an optional embodiment of the present disclosure, domain name query may be equivalent to domain name address query.

In an optional embodiment of the present disclosure, a packet data network may include but is not limited to one of the following: CDMA, LTE, an evolved packet system (EPS), an evolved packet core network (EPC), a 5G core network (5GC), a 5G system (5GS), a next-generation packet data network, and the like. The packet data network may be one of mobile communications networks.

In an optional embodiment of the present disclosure, a local service may include one of the following: MEC, an edge service, and a local data network (LADN). MEC may include one or more LADNs. Different local servers (also referred to as edge servers) are deployed in different LADNs.

In an optional embodiment of the present disclosure, non-local may be embodied as public. For example, a non-local DNS may be embodied as a public DNS, a non-local service may be embodied as a public service, and a non-local server may be embodied as a public server.

In an optional embodiment of the present disclosure, a non-LADN may be embodied as a public data network or a general data network. A non-LADN DNN may be a public DNN or a general DNN.

In an optional embodiment of the present disclosure, relocation of a PDU session may also be referred to as migration or reestablishment of the PDU session.

In an optional embodiment of the present disclosure, an address of a DNS is an address of a DNS server, and includes at least one of the following: an IP address or a MAC address.

In an optional embodiment of the present disclosure, a DNS type may include at least one of the following: a local DNS or a non-local DNS. The local DNS may further include one of the following: an MEC DNS and an LADN DNS. The non-local DNS may also be referred to as a non-MEC DNS, a non-LADN DNS, or a public DNS. A DNS whose DNS type is local may be referred to as a DNS of a local service. The DNS of the local service may also be referred to as a DNS of a local network (for example, an LADN DNS).

In an optional embodiment of the present disclosure, a server address includes at least one of the following: an IP address or a MAC address.

In an optional embodiment of the present disclosure, an LADN DNN is an abbreviation of a DNN in an LADN or an abbreviation of a DNN of an LADN type. Generally, there may be only one DNN in one LADN.

In an optional embodiment of the present disclosure, a service (traffic) flow includes but is not limited to at least one of the following: a domain name, an application, an IP triple, or a DNN. In an implementation, all domain names of an application support a local service. In another implementation, some domain names of an application support a local service, such as a browser application. Description information of the service (traffic) flow includes but is not limited to at least one of the following: a domain name, application description information (for example, an application identifier and/or an identifier of an operating system), an internet protocol address (IP) triplet, a DNN, or the like.

In an optional embodiment of the present disclosure, an area or a location includes at least one of a tracking area (TA), a RAN network element, a cell, or a data network name (DNN). Area information or location information includes at least one of the following: an identifier of a tracking area (TA), an identifier of a RAN network element, an identifier of a cell, or a data network name (DNN). When a service area of a local service is a DNN, the DNN may be an LADN DNN.

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, in the specification and claims, "and/or" is used to indicate at least one of connected objects. For example, A and/or B represents the following three cases: Only A is included, only B is included, and both A and B exist.

In the embodiments of the present disclosure, the word such as "example" or "for example" is used to represent giving an example, an illustration, or a description. Any embodiment or design scheme described as an "example" or "for example" in the embodiments of the present disclosure should not be explained as being more preferred or having more advantages than another embodiment or design scheme. Exactly, use of the term "example" or "for example" is intended to present a concept in a specific manner.

The technology described in this specification is not limited to a Long Term Evolution (LTE)/LTE-Advanced (LTE-A) system, and can also be used in various wireless communications systems such as code division multiple access (CDMA), time division multiple access (TDMA), frequency division multiple access (FDMA), orthogonal frequency division multiple access (OFDMA), single-carrier frequency-division multiple access (SC-FDMA), and another system.

The terms "system" and "network" are often used interchangeably. The CDMA system may implement wireless technologies such as CDMA2000 and universal terrestrial radio access (UTRA). UTRA includes wideband CDMA (WCDMA) and other CDMA variants. The TDMA system can implement radio technologies such as global system for mobile communications (GSM). The OFDMA system can implement radio technologies such as Ultra Mobile Broadband (UMB), Evolved-UTRA (E-UTRA), IEEE 802.11 (Wi-Fi), IEEE 802.16 (WiMAX), IEEE 802.20, and Flash-OFDM. UTRA and E-UTRA are parts of a universal mobile telecommunications system (UMTS). LTE and more advanced LTE (for example, LTE-A) are new UMTS versions using E-UTRA. UTRA, E-UTRA, UMTS, LTE, LTE-A, and GSM are described in the literature from an organization called 3rd Generation Partnership Project (3GPP). CDMA2000 and UMB are described in the literature from an organization called "3rd Generation Partnership Project 2" (3GPP2). The technologies described herein can be used both in the systems and radio technologies mentioned above, and can also be used in other systems and radio technologies.

In an optional embodiment of the present disclosure, obtaining may be understood as obtaining from a configuration, receiving, receiving through a request, obtaining through self-learning, deriving from unreceived information, or obtaining after processing based on received information. This may be specifically determined based on an actual requirement, and is not limited in the embodiments of the present disclosure. For example, when indication information of a capability sent by a device is not received, it may be deduced that the device does not support the capability.

In an optional embodiment of the present disclosure, sending may include broadcasting, broadcasting in a system message, and returning after responding to a request.

In an optional embodiment of the present disclosure, a communications device includes at least one of the following: a terminal, a core network element, or a radio access network element.

In the embodiments of the present disclosure, a core network element may include but is not limited to at least one of the following: a core network device, a core network node, a core network function, a core network element, a mobility management entity (MME), an access mobility management function (AMF), a session management function (SMF), a user plane function (UPF), a serving gateway (SGW), a PDN gateway, a policy control function (PCF), a policy and charging rules function (PCRF) unit, a serving GPRS support node (SGSN), a gateway GPRS support Node (GGSN), a user data management UDM function, a unified data repository (UDR) function, an application function (AF), a location management function (LMF), an enhanced serving mobile location centre (E-SMLC), a gateway mobile location centre (GMLC), or a network exposure function (NEF).

In the embodiments of the present disclosure, a RAN network element may include but is not limited to at least one of the following: a radio access network device, a radio access network node, a radio access network function, a RAN network element, a 3GPP radio access network, a non-3GPP radio access network, a centralized unit (CU), a distributed unit (DU), a base station, an evolved NodeB (eNB), a 5G base station (gNB), a radio network controller (RNC), a NodeB, a Non-3GPP interworking function (N3IWF), an access controller (AC) node, an access point (AP) device, a wireless local area network (WLAN) node, or a N3IWF.

The base station may be a base transceiver station (BTS) in a global system for mobile communications (GSM) or code division multiple access (CDMA), or may be a NodeB (NodeB) in WCDMA, or may be an evolved NodeB (eNB or e-NodeB) and a 5G base station (gNB) in LTE. This is not limited in the embodiments of the present disclosure.

In the embodiments of the present disclosure, the UE is a terminal. The terminal may include a relay supporting a function of the terminal and/or a terminal supporting a function of the relay. The terminal may also be referred to as a terminal device to user equipment (UE). The terminal may be a terminal side device such as a mobile phone, a tablet personal computer, a laptop computer, a personal digital assistant (PDA), a mobile internet device (MID), a wearable device, or an in-vehicle device. It should be noted that a specific type of the terminal is not limited in the embodiments of the present disclosure.

In the embodiments of the present disclosure, a non-connected state may be an inactive state (also referred to as a de-active state, such as an RRC inactive state) or an idle state (for example, an RRC idle state).

In the embodiments of the present disclosure, information of interaction between the terminal and the CN network element may be forwarded or transparently transmitted by using a radio access network.

Figure 3:
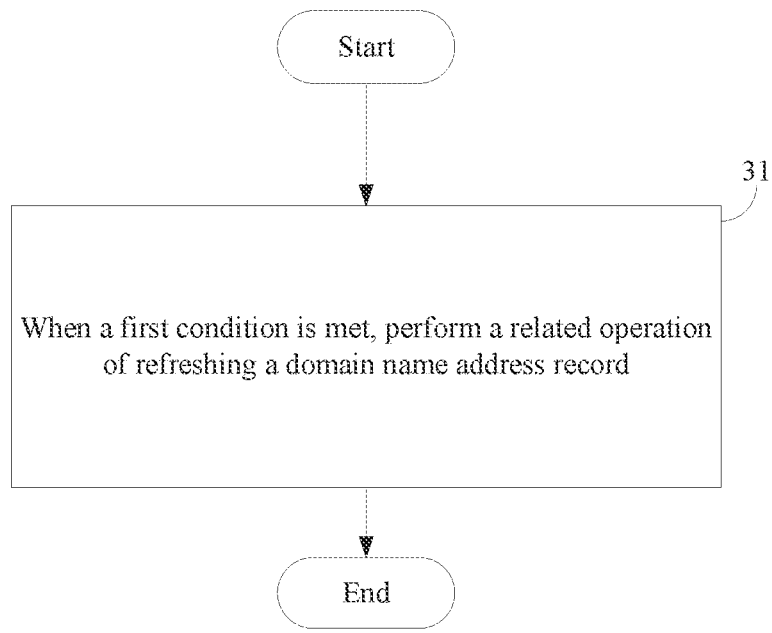
FIG. 3 is a first schematic diagram of a domain name address obtaining method according to an embodiment of the present disclosure.

Referring to FIG. 3, an embodiment of the present disclosure provides a domain name address obtaining method, applied to a first communications device. The first communications device may include but is not limited to one of the following: a terminal, an application in the terminal, a Hyper Text Transfer Protocol (Hyper Text Transfer Protocol, HTTP) service client in the terminal, and an edge enabler client in the terminal. The domain name address obtaining method may include step 31.

Step 31: In a case that a first condition is met, perform a related operation of refreshing a domain name address record.

The first condition includes at least one of the following:
(1) It is confirmed that an obtained DNS address changes, for example, it is confirmed that a domain name system (DNS) address received from a packet data network changes.
(2) A protocol data unit (PDU) relocation session is occurs, for example, PDU sessions of a same application change.
(3) It is confirmed that an obtained internet protocol address (IP) changes, for example, it is confirmed that an IP address received from the packet data network changes.
(4) A first data network name (DNN) is no longer available, for example, a terminal moves out of an available area of the first DNN.
(5) A second DNN is available, for example, the terminal moves out of an available area of the second DNN.
(6) The terminal moves from a first area to a second area.
(7) The terminal moves out of the first area.
(8) The terminal moves to the second area.
(9) A first indication is received, where the first indication is used to instruct to trigger domain name address query.
(10) The terminal is handed over.
(11) The terminal is in a connected state.

The first area may include at least one of the following: (a) a serving area of a first local service, (b) a serving area of a non-local service, or (c) an available area of the first DNN.

The second area may include at least one of the following: (a) a serving area of a second local service, (b) a serving area of a non-local service, or (c) an available area of the second DNN.

In an implementation, the case in which it is confirmed that the obtained DNS address changes may be learned of by using a DNS address in a PCO or an ePCO. For example, in an uplink classifier ("UL CL" for short) technology, after the terminal moves out of a service area of a local service, an IP address of the terminal may vary. The terminal may be notified, by configuring an address of a DNS in a service area of a new local service, to initiate domain name query.

In an implementation, after the terminal moves out of a service area of a local service, relocation of the PDU session (for example, a PDU session of a session and service continuity (SSC) mode 2 (Mode2) or an SSC mode 3 (Mode3)) may occur. In this case, the service flow may need to move from an old PDU session to a new PDU session. Initiating domain name query may be updating an address of a local server.

In an implementation, after the terminal moves out of a service area of a local service, the IP address may change (for example, a PDU session of an SSC mode 2 or an SSC mode 3). In this case, the service flow needs a new IP address for communication. Initiating domain name query may be updating an address of a local server.

In an implementation, the first DNN is a first DNN allowed by a first service flow (the service flow may include an application or a domain name), and the second DNN is a second DNN allowed by the first service flow. The first DNN may be a DNN of a first local data network (LADN) or a DNN of a non-LADN. The second DNN may be a second LADN DNN or a DNN of a non-LADN. For example, if the first service flow may allow access to one or more LADNs, the first service flow may allow DNNs of one or more LADNs. For example, if the first service flow may allow access to both an LADN and a non-LADN, the first service flow may allow both a DNN of the LADN and a DNN of the non-LADN.

In an implementation, the local service is an LADN. When the first DNN is a first LADN DNN, an available area of the first DNN is the service area of the first local service (for example, the first LADN). When the second DNN is a second LADN DNN, an available area of the second DNN is the service area of the second local service (for example, the second LADN). An available area of the DNN of the non-LADN may be an entire public land mobile network (PLMN). An available area of the DNN of the LADN is one or more tracking areas (TA). Therefore, it is not difficult to understand that the available area of the DNN of the non-LADN may overlap with available areas of DNNs of one or more LADNs. Generally, it is not difficult to understand that a priority of a policy rule corresponding to the DNN of the LADN is higher than that of a policy rule corresponding to the DNN of the non-LADN. In this way, the terminal preferentially accesses the DNN of the LADN, and accesses a local server nearby, thereby shortening a service delay.

In an implementation, the local service includes a mobile edge computing (MEC) service. The MEC service may include a plurality of service areas.

It is not difficult to understand that different service areas correspond to different local servers for a same service flow by dividing the plurality of service areas. In this way, when the terminal is located in different service areas, a same service flow accesses different local servers, so that a delay of a same service flow is shortened.

In an implementation, the MEC service includes a plurality of LADNs. It is not difficult to understand that a service area of each LADN corresponds to different local servers. In this way, when the terminal is located in service areas of different LADNs, a same service flow accesses different local servers, so that a delay of a same service flow is shortened.

In an implementation, when the terminal moves out or is about to move out of the first area, the network may perform one of the following: (1) relocating a PDU session of the terminal, (2) changing an IP address of the terminal, (3) sending information of the second area to the terminal, and (4) sending a new DNS address to the terminal.

All the foregoing information can instruct the terminal to move out of the first area or move into the second area. By refreshing a domain name query record, an address of a server can be updated in real time, so that a local server closest to the terminal is always accessed by the terminal, a service delay is minimized, and a low-delay service requirement of an application is met.

In an implementation, when a terminal is handed over (for example, a handover between base stations), a domain name address needs to be refreshed. In an MEC deployment mechanism, a local server may be deployed in an equipment room of each base station. This means that the local server needs to change each time a serving base station changes.

In an implementation, when the terminal is in a non-connected state (for example, in an inactive state or an idle state), the terminal does not need to immediately refresh the domain name address even if the terminal moves out of the first area or the terminal moves into the second area.

In an implementation, the domain name address record may be a domain name query record of the first service (traffic) flow. That is, in a case that a first condition is met, a related operation of refreshing a domain name address record is performed on only the first service flow.

The first service flow may include at least one of the following:
 (1) a service flow (for example, a domain name, an application, an internet protocol address (IP) triplet, or a DNN) supporting a local service (for example, mobile edge computing MEC or an LADN); or
 (2) a service flow allowing access to an LADN DNN, where the service flow allowing access to the LADN DNN may be a service flow that includes an LADN DNN in a UE route selection policy rule in a URSP.

Optionally, the service flow allowing access to the LADN DNN may include at least one of the following:
 (1) a service flow allowing access to a first LADN DNN; or
 (2) a service flow allowing access to a second LADN DNN.

When the service flow allows access to the first LADN DNN and the second LADN DNN, and the terminal moves from the service area of the first LADN to the service area of the second LADN, a domain name address record of the first service flow is refreshed, so that the service flow can move to a local server of the second LADN, thereby implementing service continuity.

The service flow is allowed to access the first LADN DNN but is not allowed to access the second LADN DNN. When the terminal moves out of an available area of the first LADN DNN, and the target area is a service area of a DNN of the second LADN or a non-LADN, the domain name address record of the first service flow is refreshed, so that a server (for example, a public network server) in the non-LADN can be accessed, thereby implementing service continuity.

For the service flow allowing access to the second LADN DNN, when the terminal moves out of the service area of the second LADN, the domain name address record of the first service flow is refreshed, so that a local server in the second LADN can be accessed, thereby implementing service continuity.

In an implementation, the service flow may be an application or a domain name. For example, a browser includes a plurality of domain names, MEC is deployed for only some domain names, and a corresponding local server exists.

In an implementation, only a service flow (for example, an application or a domain name) that supports a local service has a local server, and the local server changes with a location of the terminal. For a service flow of a non-local service, a domain name address record of the service flow may not be refreshed as the terminal moves. Because a server of the service flow is not local, no change occurs as the terminal moves. Repeated query may cause unnecessary resource overheads. Therefore, resource overheads can be reduced by refreshing only a domain name address record of a specific application or a specific domain name.

In an implementation, the related operation of refreshing the domain name address record in step 31 may include at least one of the following:
 (1) initiating domain name query based on a domain name in a stored domain name address record;
 (2) updating the stored domain name address record based on a domain name query result;
 (3) generating location-based domain name query information based on the domain name and location information; or
 (4) requesting domain name query based on the location-based domain name query information.

In an implementation, the location-based domain name query information may include one of the following: a location-based domain name, a domain name, and location information. In an implementation, the location-based domain name query information may be included in an HTTP request to request domain name query.

Optionally, the location information may include at least one of the following: (a) current location information of the terminal or (b) area information of the second area.

In an implementation, the second area includes a plurality of areas (for example, a plurality of TAs), and a current location of the terminal is only one area (for example, one TA). In the second area, the address of the local server of the service flow remains unchanged, and query may be performed in the second area. Alternatively, query may be performed based on a current area of the terminal. The second area may be a service area of the second LADN.

Optionally, area information of the service area of the local service may include at least one of the following:
(1) a tracking area (TA);
(2) an identifier of a RAN network element;
(3) an identifier of a cell; or
(4) a data network name (DNN) (for example, a DNN of an LADN).

Optionally, the current location information of the terminal may include at least one of the following:
(1) a tracking area (TA) in which the terminal is located;
(2) an identifier of a RAN network element of the terminal;
(3) an identifier of a cell on which the terminal camps; or
(4) a data network name (DNN) accessed by the terminal.

In an implementation, the terminal performs the related operation of refreshing the domain name address record instead of an application on the terminal.

It is not difficult to understand that when the terminal moves out of an area of a first local service, and enters an area of a non-local service or an area of a second local service, a domain name query result obtained in the area of the first local service is invalid. Either the terminal is rejected by a local server of the first local service, or a delay cannot meet a service requirement. In this case, the service flow may not initiate domain name query. In this case, the terminal may initiate domain name query again instead of an application, and update the domain name query result based on a query result. In this way, service continuity is supported.

In this embodiment of the present disclosure, service continuity is supported, and a service delay is also minimized.

Figure 4:
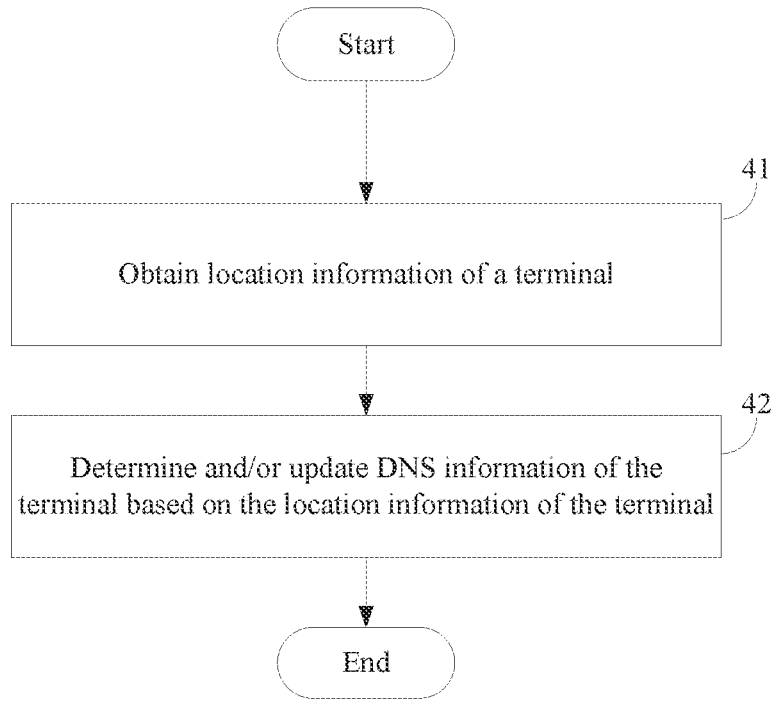
FIG. 4 is a second schematic diagram of a domain name address obtaining method according to an embodiment of the present disclosure.

Referring to FIG. 4, an embodiment of the present disclosure further provides a domain name address obtaining method, and the method is applied to a second communications device. The second communications device includes but is not limited to one of the following: a terminal, an application in the terminal, an HTTP service client in the terminal, and an edge enabler client in the terminal. The method includes step 41 and step 42.

Step 41: Obtain first information, where the first information includes at least one of the following: an address of a first DNS or a first indication, where the first indication is used to instruct to trigger domain name address query (or referred to as DNS query).

In this embodiment of the present disclosure, triggering domain name address query may also be understood as at least one of the following: (1) immediately triggering domain name address query, (2) immediately refreshing a domain name address, (3) immediately refreshing a domain name address of a service flow of a local service, or (4) refreshing a domain name address of the service flow when a DNN of the service flow changes.

Step 42: Perform a first operation based on the first information.

Optionally, an implementation of step 42 is as follows:
manner 1: When the first information includes the address of the first DNS and/or the first indication, one or more of the following is performed:
(1) replacing an address of a second DNS with the address of the first DNS;
(2) deleting a domain name address record queried by using the address of the second DNS;
(3) re-querying, by using the address of the first DNS, a domain name queried by using the address of the second DNS; and
(4) querying a domain name in the domain name address record by using the address of the first DNS.

The second DNS is a DNS obtained before step 41. For example, a second PDU session is first established, and the second DNS is first allocated; and then a first PDU session is established, and the first DNS is allocated. Alternatively, for example, a PDU session is established, and the second DNS is first allocated; and the PDU session is subsequently modified, and the first DNS is allocated.

Manner 2: When the first information includes the first indication, one or more of the following is performed:
(1) deleting a domain name address record queried by using the address of the second DNS; and
(2) initiating domain name address query for the domain name in the domain name address record.

In an implementation, the second DNS is a local DNS, and the first DNS is another local DNS. As the terminal moves, the terminal moves from a service area (edge cloud) of one local service to a service area (for example, another edge cloud) of another local service. When the local DNS changes, a previously queried domain name record is queried again, and a service address corresponding to a previous domain name is replaced. It is not difficult to understand that an address of a target edge server can be obtained.

In another implementation, the second DNS is a local DNS, and the first DNS is a non-local DNS. As the terminal moves, the terminal moves out of a service area (for example, an edge cloud) of a local service. An address of a server on a public network needs to be queried through a public DNS. When an address of a DNS changes, a previously queried domain name record is queried again, and the previous domain name record is replaced.

In another implementation, the second DNS is a non-local DNS, and the first DNS is a local DNS. As the terminal moves, the terminal moves to a service area (for example, an edge cloud) of a local service. An address of a server on a public network needs to be queried through a local DNS. When an address of a DNS changes, a previously queried domain name record is queried again, and the previous domain name record is replaced.

In this embodiment of the present disclosure, service continuity is supported, and a service delay is also minimized.

Figure 5:
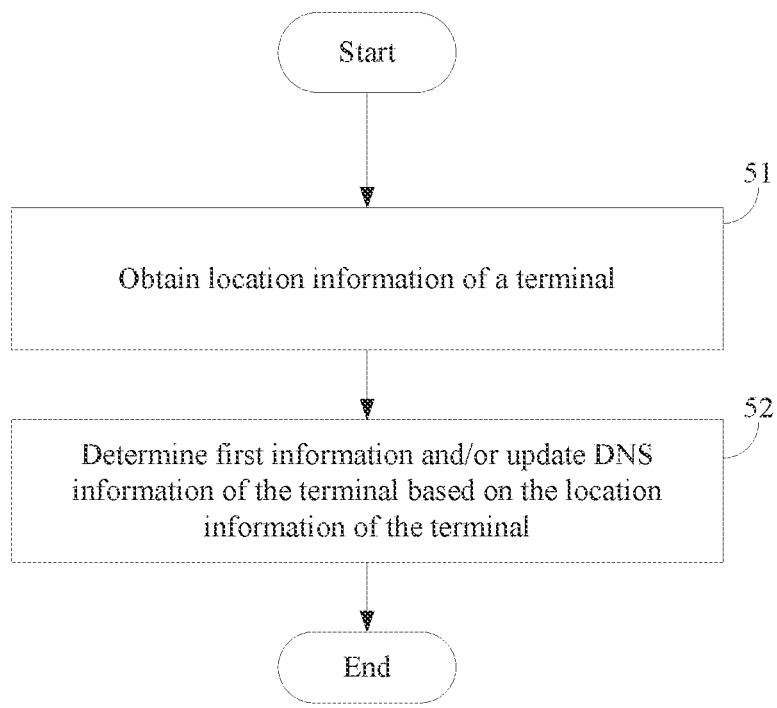
FIG. 5 is a third schematic diagram of a domain name address obtaining method according to an embodiment of the present disclosure.

Referring to FIG. 5, an embodiment of the present disclosure provides a domain name address obtaining method, applied to a third communications device. The third communications device includes but is not limited to core network (CN) elements, such as an access and mobility management function (AMF), a session management function (SMF), a user plane function (UPF), a policy control function (PCF), an application function (AF), and an edge enabler server. The method includes the following steps.

Step 51: Obtain location information of a terminal.

Step 52: Determine first information and/or update DNS information of the terminal based on the location information of the terminal.

The DNS information may include at least one of the following: (1) an address of a DNS, or (2) a DNS type.

The first information may include at least one of the following: (1) an address of a first DNS or (2) a first indication, where the first indication is used to instruct to trigger domain name address query.

In an implementation, the first DNS may be a DNS different from a second DNS. The second DNS may be a DNS configured for the terminal before step 52.

The first DNS may be a first local DNS or a non-local DNS.

The second DNS may be a second local DNS or a non-local DNS.

In an implementation, as the terminal moves, the terminal moves from a service area (edge cloud) of a second local service to a service area (for example, another edge cloud) of a first local service, a DNS of the first local service may be configured for the terminal, where the first DNS may be a DNS of the first local service, and the second DNS may be a DNS of the second local service.

In an implementation, as the terminal moves, the terminal moves from a service area (edge cloud) of a second local service to a service area (for example, another edge cloud) of a non-local service, a DNS of the non-local service may be configured for the terminal, where the first DNS may be a DNS of the non-local service, and the second DNS may be a DNS of the second local service.

In an implementation, as the terminal moves, the terminal moves from a service area (edge cloud) of a non-local service to a service area (for example, another edge cloud) of a first local service, a DNS of the first local service may be configured for the terminal, where the first DNS may be a DNS of the first local service, and the second DNS may be a DNS of the non-local service.

Optionally, the DNS type may include at least one of the following: a local DNS or a non-local DNS.

The local DNS may further include one of the following: an MEC DNS and an LADN DNS. The non-local DNS may further include one of the following: a non-MEC DNS, a non-LADN DNS, and a public DNS.

Optionally, the location information of the terminal may include at least one of the following:

(1) a tracking area (TA);
(2) an identifier of a RAN network element;
(3) an identifier of a cell; or
(4) a data network name (DNN).

In an implementation, different DNSs (for example, a DNS of a local service) are determined based on the location information of the terminal.

In an implementation, the method may further include: sending the first information to the terminal.

In this embodiment of the present disclosure, service continuity is supported, and a service delay is also minimized.

Figure 6:
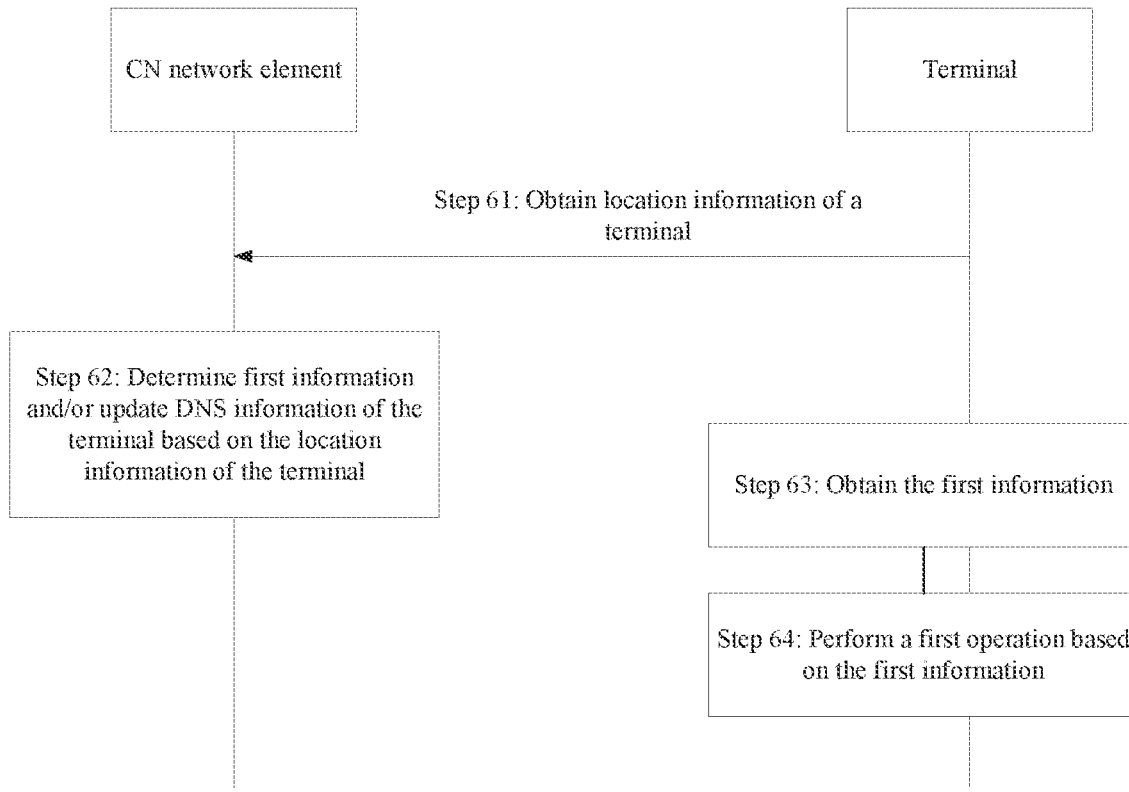
FIG. 6 is a fourth schematic diagram of a domain name address obtaining method according to an embodiment of the present disclosure.

Referring to FIG. 6, the execution steps of the domain name address obtaining method are as follows.

Step 61: A CN network element obtains location information of a terminal.

Step 62: The CN network element determines first information and/or updates DNS information of the terminal based on the location information of the terminal.

Step 63: The terminal obtains the first information.

Step 64: The terminal performs a first operation based on the first information.

It can be understood that, for descriptions of steps 61 to 64, refer to the descriptions in FIG. 4 and FIG. 5.

Figure 7:
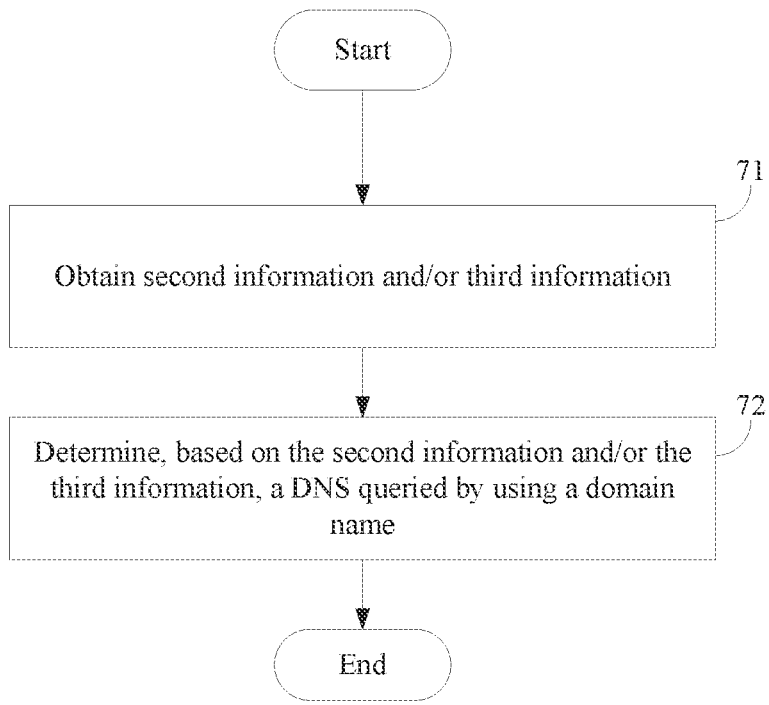
FIG. 7 is a fifth schematic diagram of a domain name address obtaining method according to an embodiment of the present disclosure.

Referring to FIG. 7, an embodiment of the present disclosure provides a domain name address obtaining method, applied to a fourth communications device. The fourth communications device includes but is not limited to one of the following: a terminal, an application in the terminal, an HTTP service client in the terminal, and an edge enabler client in the terminal. The method includes the following steps.

Step 71: Obtain second information.

The second information may include at least one of the following: (1) DNS information, (2) description information of a service flow using a first DNS, (3) description information of a service flow using a second DNS, (4) description information of a service flow using a local DNS, (5) description information of a service flow using a non-local DNS, (6) an address of a DNS of a service flow, or (7) a DNS type of the DNS of the service flow.

In an implementation, the foregoing content in the second information in step 71 may not be simultaneously obtained.

Step 72: Determine, based on the second information, a DNS queried by using a domain name.

Optionally, the DNS information includes at least one of the following: an address of a local DNS or an address of a non-local DNS; or the DNS information includes at least one of the following: an address of the first DNS, an address of the second DNS, a DNS type of the first DNS, or a DNS type of the second DNS.

Optionally, the DNS type includes at least one of the following: a local DNS or a non-local DNS. The local DNS may further include one of the following: an MEC DNS and an LADN DNS. The non-local DNS may further include one of the following: a non-MEC DNS, a non-LADN DNS, and a public DNS.

In an implementation, the DNS information is obtained by using a PCO or an ePCO.

Optionally, an implementation of step 72 is as follows.

Manner 1: In a case that a first condition is met, it is determined that a DNS queried by using a domain name of a service flow is the first DNS. The first condition may include at least one of the following: (1) a DNS type of the service flow being a local DNS, (2) a first DNS type being a local DNS, or (3) the service flow (for example, an application) triggering domain name address query.

Manner 2: In a case that a second condition is met, it is determined that an address of a DNS queried by using a domain name of a service flow is the second DNS. The second condition may include at least one of the following: (1) the DNS type of the service flow is a non-local DNS, (2) the second DNS is a non-local DNS, or (3) the service flow triggers domain name address query.

Manner 3: In a case that a third condition is met, it is determined that a DNS queried by using a domain name of a service flow is a local DNS, where the third condition may include at least one of the following: (1) the DNS type of the service flow is local DNS, or (2) the service flow triggers domain name address query.

Manner 4: In a case that a fourth condition is met, it is determined that an address of a DNS queried by using a domain name of a service flow is a non-local DNS.

The fourth condition may include at least one of the following: (1) the DNS type of the service flow is a non-local DNS, or (2) the service flow triggers domain name address query.

In this embodiment of the present disclosure, service continuity is supported, and a service delay is also minimized.

Figure 8:
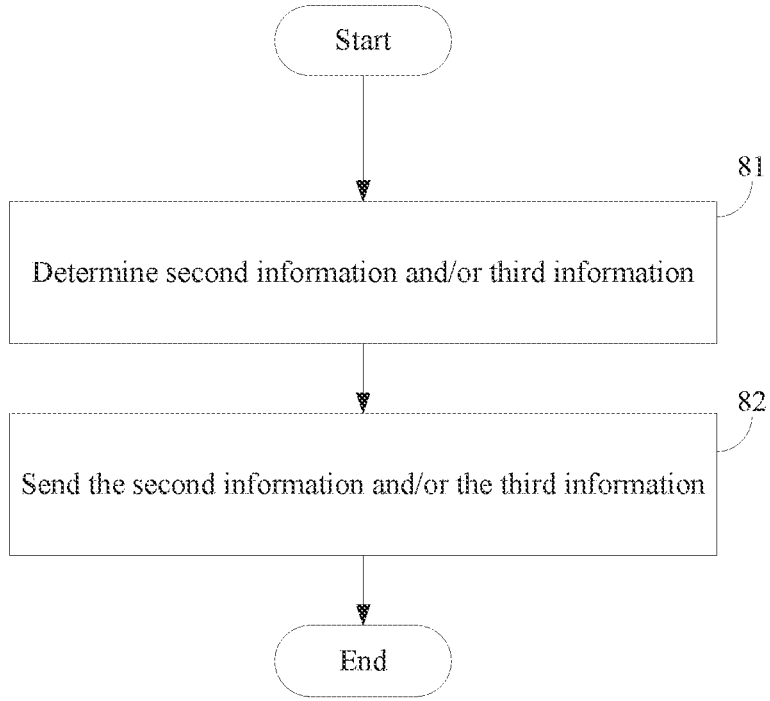
FIG. 8 is a sixth schematic diagram of a domain name address obtaining method according to an embodiment of the present disclosure.

Referring to FIG. 8, an embodiment of the present disclosure provides a domain name address obtaining method, applied to a fifth communications device. The fifth communications device includes but is not limited to a CN network element, such as an AMF, an SMF, a UPF, a PCF, an AF, and an edge enabler server. The method includes the following steps.

Step 81: Determine second information and/or third information.

For example, the second information and/or the third information are/is determined based on location information of a terminal.

Step 82: Send the second information and/or the third information.

The second information may include at least one of the following: (1) DNS information, (2) description information of a service flow using a first DNS, (3) description information of a service flow using a second DNS, (4) description information of a service flow using a local DNS, (5) description information of a service flow using a non-local DNS, (6) an address of a DNS of a service flow, or (7) a DNS type of the DNS of the service flow.

The third information includes at least one of the following: (1) an address of a second local DNS; (2) a second indication, where the second indication is used to instruct to delete an address of a first local DNS; (3) a third indication, where the third indication is used to instruct to trigger domain name address query; or (4) an address of a third DNS.

Optionally, the DNS information includes at least one of the following: (a) an address of a local DNS or (b) an address of a non-local DNS; or the DNS information includes at least one of the following: (a) an address of the first DNS, (b) an address of the second DNS, (c) a DNS type of the first DNS, or (d) a DNS type of the second DNS.

Optionally, the DNS type includes at least one of the following: a local DNS and a non-local DNS.

The local DNS may further include one of the following: an LADN DNS or an MEC DNS. The non-local DNS may further include one of the following: a non-MEC DNS, a non-LADN DNS, and a public DNS.

Optionally, the location information of the terminal includes at least one of the following: (1) an identifier of a TA, (2) an identifier of a RAN network element, (3) an identifier of a cell, or (4) a DNN.

In an implementation, different local DNSs are determined based on locations of the terminal. When the location changes, the first local DNS may change to the second local DNS or a non-local DNS.

In an implementation, content (1) to (7) in the second information may not be simultaneously sent.

In an implementation, the second information (for example, the DNS information) is sent by using a PCO or an ePCO.

In another implementation, the second information is sent by using a terminal policy (for example, a URSP). That is, the terminal policy includes the second information.

Figure 9:
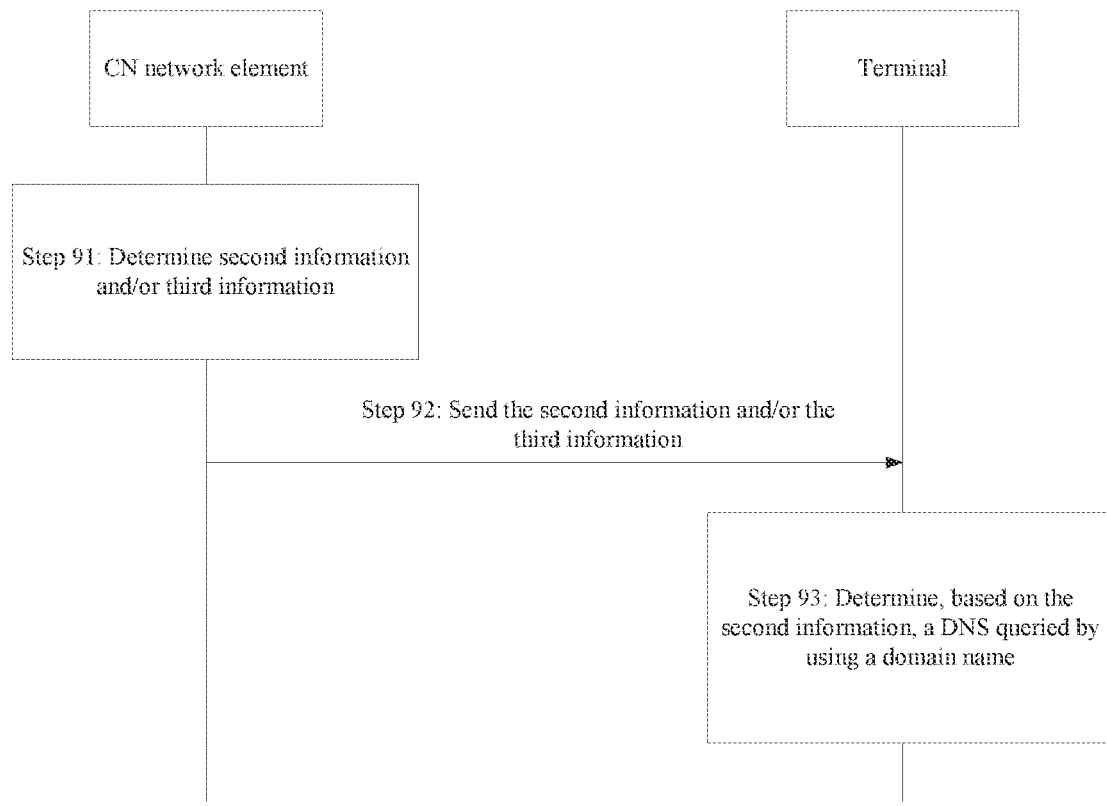
FIG. 9 is a seventh schematic diagram of a domain name address obtaining method according to an embodiment of the present disclosure.

In this embodiment of the present disclosure, service continuity is supported, and a service delay is also minimized. Referring to FIG. 9, the execution steps of the domain name address obtaining method are as follows.

Step 91: A CN network element determines second information.

Step 92: The CN network element sends the second information to a terminal.

Step 93: The terminal determines, based on the second information, a DNS queried by using a domain name.

It can be understood that, for descriptions of steps 91 to 93, refer to the descriptions in FIG. 7 and FIG. 8.

Figure 10:
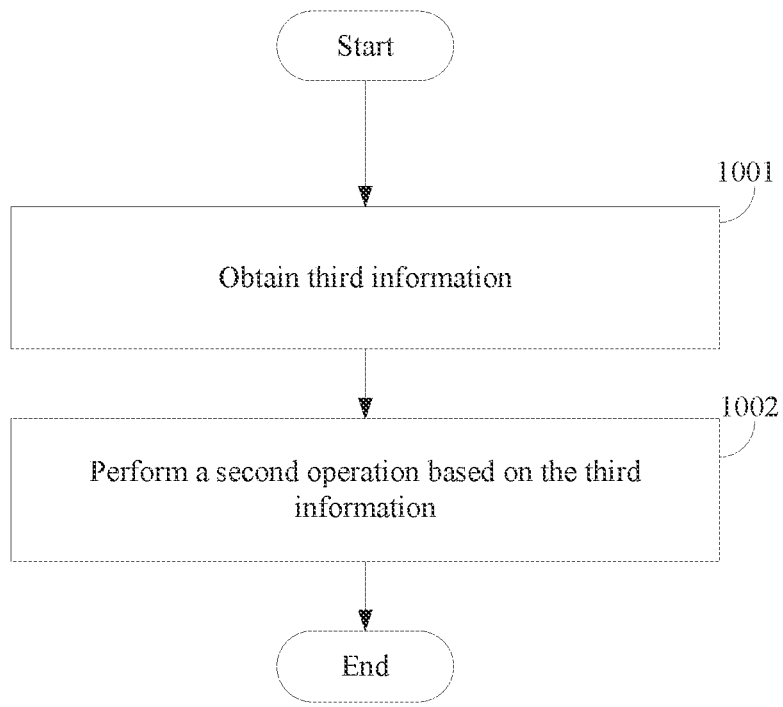
FIG. 10 is an eighth schematic diagram of a domain name address obtaining method according to an embodiment of the present disclosure.

Referring to FIG. 10, an embodiment of the present disclosure provides a domain name address obtaining method, applied to a sixth communications device. The sixth communications device includes but is not limited to one of the following: a terminal, an application in the terminal, an HTTP service client in the terminal, and an edge enabler client in the terminal. The method includes the following steps.

Step 1001: Obtain third information, where the third information includes at least one of the following: (1) an address of a second local DNS; (2) a second indication, where the second indication is used to instruct to delete an address of a first local DNS; (3) a third indication, where the third indication is used to instruct to trigger domain name address query; or (4) an address of a third DNS.

Step 1002: Perform a second operation based on the third information.

In this embodiment of the present disclosure, triggering domain name address query may also be understood as at least one of the following: (1) immediately triggering domain name address query, (2) immediately refreshing a domain name address, (3) immediately refreshing a domain name address of a service flow of a local service, or (4) refreshing a domain name address of the service flow when a DNN of the service flow changes.

In an implementation, an implementation of step 1002 is as follows:
When the third information includes the address of the second DNS and/or the third indication, one or more of the following is performed:
(1) replacing the address of the first local DNS with the address of the second local DNS;
(2) querying a domain name related to a first service flow (for example, a first application) from the second local DNS, where optionally, the first service flow is a service flow whose DNS type is a local DNS, or a service flow whose domain name is queried by using the first local DNS;
(3) deleting a domain name address record queried by using the first local DNS;
(4) querying, by using the second local DNS, a domain name queried by using the first local DNS.

In another implementation, an implementation of step 1002 is as follows: when the third information includes the second indication and/or the third indication, one or more of the following is performed:
(1) deleting the address of the first local DNS or an address of a first DNS;
(2) querying a domain name related to a first service flow from a non-local DNS;
(3) deleting a domain name address record queried by using the first local DNS;
(4) querying, by using the non-local DNS, a domain name queried by using the first local DNS;
(5) querying the domain name related to the first service flow from a second DNS;
(6) deleting a domain name address record queried by using the first DNS; and
(7) querying, by using the second DNS, a domain name queried by using the first DNS, where
the first service flow is a service flow whose DNS type is local DNS or a service flow whose domain name is queried by using the first DNS.

In another implementation, an implementation of step 1002 is as follows:
when the third information includes the address of the third DNS and/or the third indication, one or more of the following is performed:

(1) replacing an address of a first DNS with the address of the third DNS;
(2) querying a domain name related to a first service flow from the third DNS;
(3) deleting a domain name address record queried by using the first DNS; and
(4) querying, by using the third DNS, a domain name queried by using the first DNS, where the first service flow is a service flow whose DNS type is local DNS or an application whose domain name has been queried by using the first DNS.

In an implementation, as the terminal moves, the terminal moves from a service area (for example, an edge cloud) of one local service to a service area (edge cloud) of another local service. When the local DNS changes, a previously queried domain name record is queried again, and a service address corresponding to a previous domain name is replaced. It is not difficult to understand that an address of a target edge server can be obtained.

In another implementation, the non-local DNS is a public DNS. As the terminal moves, the terminal moves out of a service area (edge cloud) of a local service, and the local DNS is deleted. An address of a server on a public network needs to be queried through a public DNS. When an address of a DNS changes, a previously queried domain name record is queried again, and the previous domain name record is replaced.

In this embodiment of the present disclosure, service continuity is supported, and a service delay is also minimized.

Figure 11:
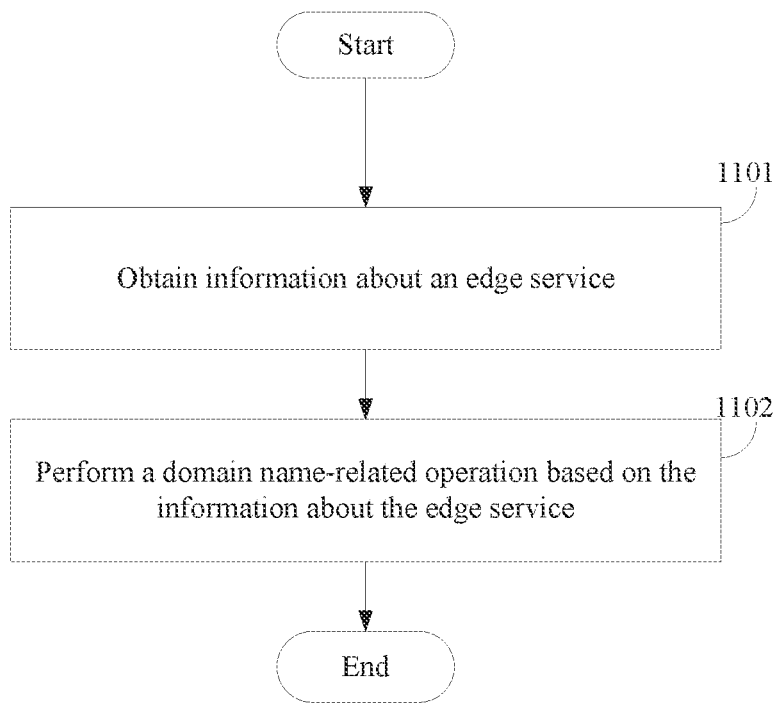
FIG. 11 is a first schematic diagram of a method for supporting control of an edge service according to an embodiment of the present disclosure.

Referring to FIG. 11, an embodiment of the present disclosure provides a method for supporting control of an edge service, applied to a seventh communications device. The seventh communications device includes but is not limited to one of the following: a terminal, an application in the terminal, an HTTP service client in the terminal, and an edge enabler client in the terminal. The method includes the following steps.

Step 1101: Obtain information of an edge service.

Step 1102: Perform a domain name-related operation based on the information of the edge service.

Optionally, the performing a domain name-related operation in step 1102 may include at least one of the following:
generating a location-based domain name based on a domain name and location information;
sending the domain name and the location information (used for domain name query); or
querying a server address corresponding to the location-based domain name from a DNS by using the location-based domain name.

When the location information is updated, a new location-based domain name is generated based on the updated location information, and location-based domain name query is re-initiated.

In this embodiment of the present disclosure, service continuity is supported, and a service delay is also minimized.

Figure 12:
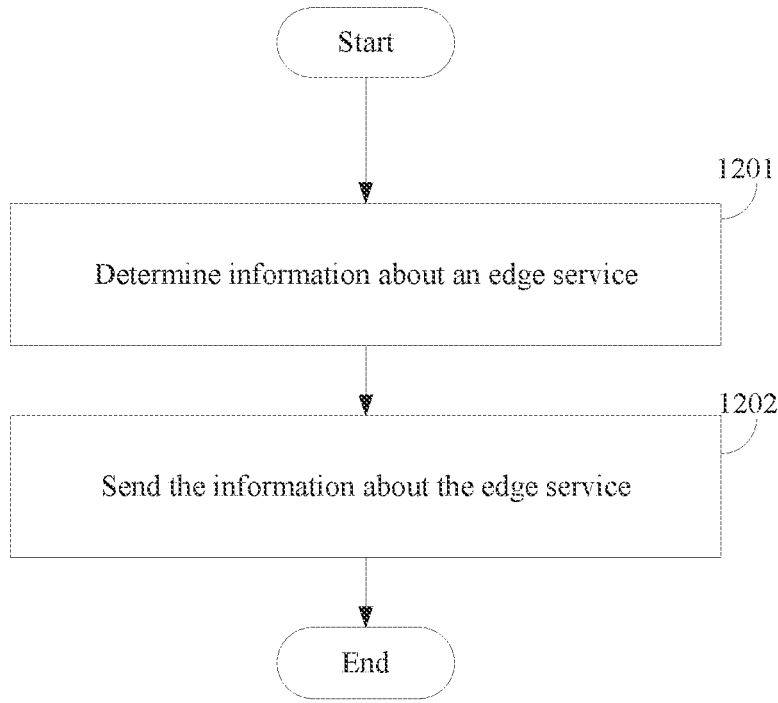
FIG. 12 is a second schematic diagram of a method for supporting control of an edge service according to an embodiment of the present disclosure.

Referring to FIG. 12, an embodiment of the present disclosure provides a domain name address obtaining method, applied to an eighth communications device. The eighth communications device includes but is not limited to a CN network element, such as an AMF, an SMF, a UPF, a PCF, an AF, and an edge enabler server. The method includes the following steps.

Step 1201: Determine information of an edge service.
Step 1202: Send the information of the edge service.

The information of the edge service includes at least one of the following: information of an LADN or a terminal policy related to a service flow.

A terminal that subscribes to an edge service (for example, an MEC) may be implemented by subscribing to one or more LADNs. The LADN is an LADN in the edge service.

Optionally, the operation of determining information of an edge service in step 1201 includes at least one of the following:
(1) determining information of an LADN in the edge service; or
(2) determining a terminal policy related to a service flow for which the edge service is allowed or deployed.

The operation of determining a terminal policy (for example, a URSP) related to a service flow for which the edge service is allowed or deployed includes at least one of the following:
(1) configuring one or more route selection rules (for example, UE Route Selection Policy Rule in URSP) for the service flow, where each route selection rule includes one DNN; or
(2) configuring one or more LADN (which may be an LADN in the edge service) DNNs and/or one non-LADN DNN (or referred to as a public DNN) for the service flow.

Optionally, when a route selection rule of the service flow includes a non-LADN DNN, a priority of the route selection rule corresponding to the non-LADN DNN (or referred to as a public DNN) is lowest in all route selection rules of the service flow, or is lower than a priority of a route selection rule corresponding to an LADN DNN.

It is not difficult to understand that, by means of such configuration, the terminal preferentially accesses the LADN DNN, and the service flow also selects a local server corresponding to the LADN. Only when the terminal moves out of service areas of all available LADNs or service areas of all available local servers, the terminal selects a non-LADN DNN (or referred to as a public DNN), and the service flow chooses to access a non-local server.

Optionally, the information of the edge service is sent to the terminal.

In this embodiment of the present disclosure, service continuity is supported, and a service delay is also minimized.

Figure 13:
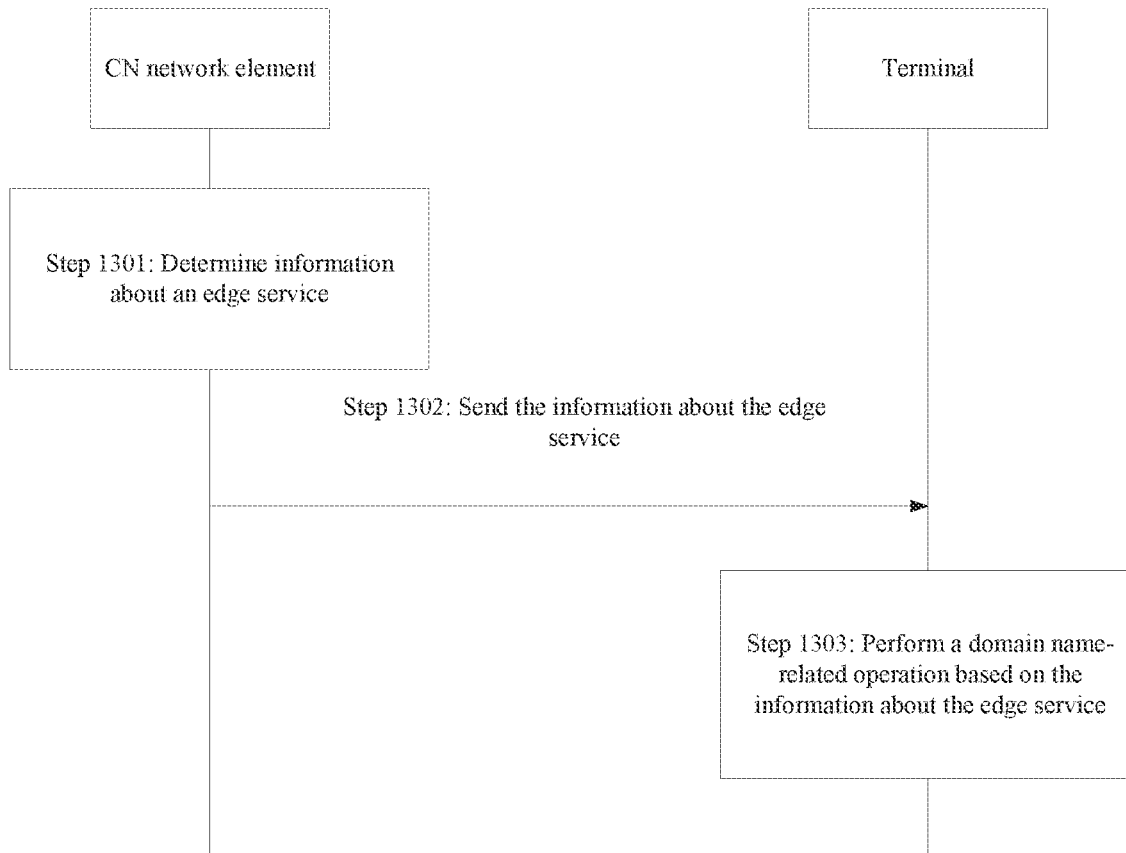
FIG. 13 is a third schematic diagram of a method for supporting control of an edge service according to an embodiment of the present disclosure.

Referring to FIG. 13, the execution steps of the domain name address obtaining method are as follows.

Step 1301: A CN network element determines information of an edge service.

Step 1302: The CN network element sends the information of the edge service to a terminal.

Step 1303: The terminal performs a domain name-related operation based on the information of the edge service.

It can be understood that, for descriptions of steps 1301 to 1303, refer to the descriptions in FIG. 11 and FIG. 12.

Application Scenario 1

Figure 14:
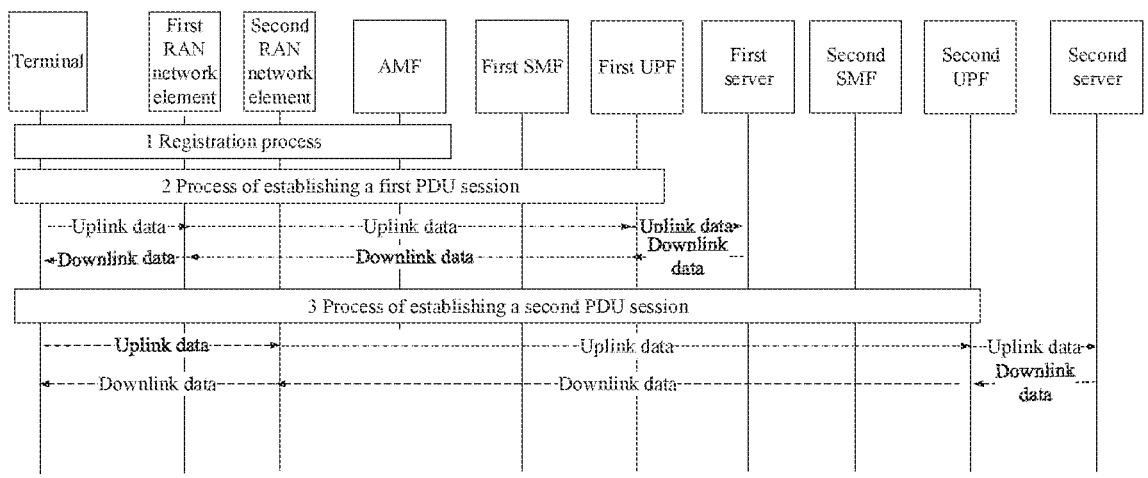
FIG. 14 is a ninth schematic diagram of a domain name address obtaining method according to an embodiment of the present disclosure.

The application scenario mainly describes a migrating process of a local server in a moving process of a terminal. As shown in FIG. 14, the following steps are included:

step 1: during registration, UE obtains information of an edge service. The information of the edge service may be described in the embodiment in FIG. 12.

Step 2: in a service area of a first LADN or in a service area of a non-LADN, the UE establishes a first PDU session by using a first RAN network element, an AMF, a first SMF, and a first UPF. In a process of establishing the first PDU session, an address of a first DNS is obtained. A service flow on the terminal triggers domain name address query to obtain an address of a first server. An application on the terminal exchanges data with the first server.

When the terminal is in the service area of the first LADN, the first server is a first local server.

When the terminal is in a service area of a non-first LADN, the first server is a non-local server (for example, a public server).

Step 3: the UE moves into a service area of a second LADN. The UE establishes a second PDU session by using a second RAN network element, the AMF, a second SMF, and a second UPF.

Alternatively, the UE moves out of the service area of the first LADN and moves into a service area of a non-LADN, and no LADN is available. The UE establishes a second PDU session by using a second RAN network element, the AMF, a second SMF, and a second UPF.

In an implementation, in a case that a first condition is met, the terminal performs a related operation of refreshing a domain name address record to obtain an address of a second server, which may be described in the embodiment shown in FIG. 3.

In another implementation, in a process of establishing the second PDU session, an address of a second DNS is obtained. The terminal triggers domain name address query from the second DNS to obtain an address of a second server.

In another implementation, in a process of establishing the second PDU session, first information (as described in the embodiment of FIG. 4), second information (as described in the embodiment of FIG. 7), or third information (as described in the embodiment of FIG. 10) is obtained, and an operation is performed based on the obtained information to obtain an address of the second server.

An application on the terminal exchanges data with the second server.

When the terminal is in the service area of the second LADN, the second server is a second local server.

When the terminal is in a service area of a non-LADN, the second server is a non-local server (for example, a public server).

The establishment of the second PDN session may be actively initiated by the UE (for example, an SSC mode 2), or a network triggers the UE to initiate the establishment (for example, an SSC mode 3).

Figure 15:
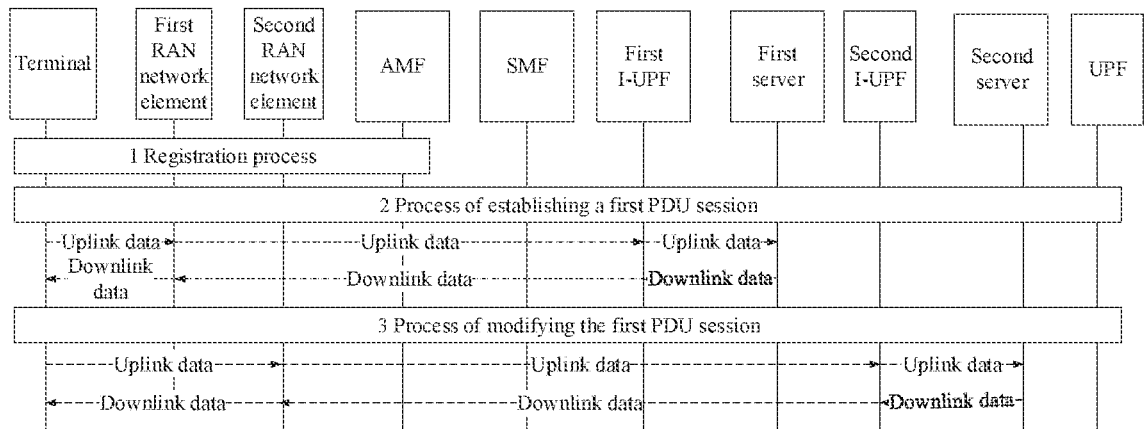
FIG. 15 is a tenth schematic diagram of a domain name address obtaining method according to an embodiment of the present disclosure.

The application scenario mainly describes a migrating process of a local server in a moving process of a terminal. As shown in FIG. 15, the following steps are included:

step 1: During registration, UE obtains information of an edge service. The information of the edge service may be described in the embodiment in FIG. 12.

Step 2: in a service area of a first LADN, the UE establishes a first PDU session by using a first RAN network element, an AMF, an SMF, a first I-UPF, and a UPF.

Alternatively, in a service area of a non-LADN, the UE establishes a first PDU session by using a first RAN network element, an AMF, an SMF, and a UPF.

In a process of establishing the first PDU session, an address of a first DNS is obtained. A service flow on the terminal triggers domain name address query to obtain an address of a first server. An application on the terminal exchanges data with the first server.

When the terminal is in the service area of the first LADN, the first server is a first local server.

When the terminal is in a service area of a non-LADN, the first server is a non-local server (for example, a public server).

Step 3: in a case that a first condition is met, a network initiates a PDU session modification process to the first PDU session. In this case, the first I-UPF changes to a second I-UPF, and the first I-UPF is deleted or the second I-UPF is inserted.

The first condition is one of the following:
the UE moving into a service area of a second LADN;
the UE moving out of the service area of the first LADN, and moving into a service area of a non-LADN, and no LADN is available.

In an implementation, in a case that a first condition is met, the terminal performs a related operation of refreshing a domain name address record to obtain an address of a second server, which may be described in the embodiment shown in FIG. 3.

In another implementation, in the PDU session modification process, an address of a second DNS is obtained. The terminal triggers domain name address query from the second DNS to obtain an address of a second server.

In another implementation, in the PDU session modification process, first information (as described in the embodiment of FIG. 4), second information (as described in the embodiment of FIG. 7), or third information (as described in the embodiment of FIG. 10) is obtained, and an operation is performed based on the obtained information to obtain an address of the second server.

An application on the terminal exchanges data with the second server.

When the UE moves into the service area of the second LADN, the second server is a second local server.

When the UE moves out of the service area of the first LADN, and moves into a service area of a non-LADN, and no LADN is available, the second server is a non-local server (for example, a public server).

The establishment of the second PDN session may be actively initiated by the UE (for example, an SSC mode 2), or a network triggers the UE to initiate the establishment (for example, an SSC mode 3).

Figure 16:
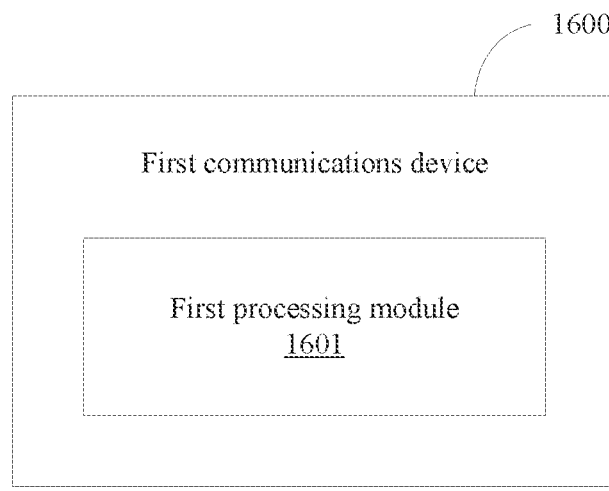
FIG. 16 is a first schematic diagram of a first communications device according to an embodiment of the present disclosure.

Referring to FIG. 16, an embodiment of the present disclosure further provides a first communications device, and the first communications device 1600 includes:

a first processing module 1601, configured to: in a case that a first condition is met, perform a related operation of refreshing a domain name address record.

The first condition includes at least one of the following:
(1) It is confirmed that an obtained DNS address changes, for example, it is confirmed that a DNS address received from a packet data network changes.
(2) A PDU session relocation is occurs, for example, PDU sessions of a same application change.
(3) It is confirmed that an obtained IP address changes, for example, it is confirmed that an IP address received from the packet data network changes.
(4) A first DNN is no longer available, for example, a terminal moves out of an available area of the first DNN.
(5) A second DNN is available, for example, the terminal moves out of an available area of the second DNN.
(6) The terminal moves from a first area to a second area.
(7) The terminal moves out of the first area.
(8) The terminal moves to the second area.
(9) A first indication is received, where the first indication is used to instruct to trigger domain name address query.
(10) The terminal is handed over.
(11) The terminal is in a connected state.

The first area may include at least one of the following: (a) a serving area of a first local service, (b) a serving area of a non-local service, or (c) an available area of the first DNN.

The second area may include at least one of the following: (a) a serving area of a second local service, (b) a serving area of a non-local service, or (c) an available area of the second DNN.

In an implementation, the case in which it is confirmed that the obtained DNS address changes may be learned of by using a DNS address in a PCO or an ePCO. For example, in an ULCL technology, after the terminal moves out of a service area of a local service, an IP address of the terminal may vary. The terminal may be notified, by configuring an address of a DNS in a service area of a new local service, to initiate domain name query.

In an implementation, after the terminal moves out of a service area of a local service, relocation of the PDU session (for example, a PDU session of an SSC mode 2 or an SSC mode 3) may occur. In this case, the service flow may need to move from an old PDU session to a new PDU session. Initiating domain name query may be updating an address of a local server.

In an implementation, after the terminal moves out of a service area of a local service, the IP address may change (for example, a PDU session of an SSC mode 2 or an SSC mode 3). In this case, the service flow needs a new IP address for communication. Initiating domain name query may be updating an address of a local server.

In an implementation, the first DNN is a first DNN allowed by a first service flow (the service flow may include an application or a domain name), and the second DNN is a second DNN allowed by the first service flow. The first DNN may be a DNN of a first LADN or a DNN of a non-LADN. The second DNN may be a second LADN DNN or a DNN of a non-LADN. For example, if the first service flow may allow access to one or more LADNs, the first service flow may allow DNNs of one or more LADNs. For example, if the first service flow may allow access to both an LADN and a non-LADN, the first service flow may allow both a DNN of the LADN and a DNN of the non-LADN.

In an implementation, the local service is an LADN. When the first DNN is a first LADN DNN, an available area of the first DNN is the service area of the first local service (for example, the first LADN). When the second DNN is a second LADN DNN, an available area of the second DNN is the service area of the second local service (for example, the second LADN). An available area of the DNN of the non-LADN may be an entire PLMN. An available area of the DNN of the LADN is one or more TAs. Therefore, it is not difficult to understand that the available area of the DNN of the non-LADN may overlap with available areas of DNNs of one or more LADNs. Generally, it is not difficult to understand that a priority of a policy rule corresponding to the DNN of the LADN is higher than that of a policy rule corresponding to the DNN of the non-LADN. In this way, the terminal preferentially accesses the DNN of the LADN, and accesses a local server nearby, thereby shortening a service delay.

In an implementation, the local service includes an MEC service. The MEC service may include a plurality of service areas.

It is not difficult to understand that different service areas correspond to different local servers for a same service flow by dividing the plurality of service areas. In this way, when the terminal is located in different service areas, a same service flow accesses different local servers, so that a delay of a same service flow is shortened.

In an implementation, the MEC service includes a plurality of LADNs. It is not difficult to understand that a service area of each LADN corresponds to different local servers. In this way, when the terminal is located in service areas of different LADNs, a same service flow accesses different local servers, so that a delay of a same service flow is shortened.

In an implementation, when the terminal moves out or is about to move out of the first area, the network may perform one of the following: (1) relocating a PDU session of the terminal, (2) changing an IP address of the terminal, (3) sending information of the second area to the terminal, and (4) sending a new DNS address to the terminal.

All the foregoing information can instruct the terminal to move out of the first area or move into the second area. By refreshing a domain name query record, an address of a server can be updated in real time, so that a local server closest to the terminal is always accessed by the terminal, a service delay is minimized, and a low-delay service requirement of an application is met.

In an implementation, when a terminal is handed over (for example, a handover between base stations), a domain name address needs to be refreshed. In an MEC deployment mechanism, a local server may be deployed in an equipment room of each base station. This means that the local server needs to change each time a serving base station changes.

In an implementation, when the terminal is in a non-connected state (for example, in an inactive state or an idle state), the terminal does not need to immediately refresh the domain name address even if the terminal moves out of the first area or the terminal moves into the second area.

In an implementation, the domain name address record may be a domain name query record of the first service (traffic) flow. That is, in a case that a first condition is met, a related operation of refreshing a domain name address record is performed on only the first service flow.

The first service flow may include at least one of the following:
  (1) a service flow (for example, a domain name, an application, an IP triplet, or a DNN) supporting a local service (for example, mobile edge computing MEC or an LADN); or
  (2) a service flow allowing access to an LADN DNN, where the service flow allowing access to the LADN DNN may be a service flow that includes an LADN DNN in a UE route selection policy rule in a URSP.

Optionally, the service flow allowing access to the LADN DNN may include at least one of the following:
  (1) a service flow allowing access to a first LADN DNN; or
  (2) a service flow allowing access to a second LADN DNN.

When the service flow allows access to the first LADN DNN and the second LADN DNN, and the terminal moves from the service area of the first LADN to the service area of the second LADN, a domain name address record of the first service flow is refreshed, so that the service flow can move to a local server of the second LADN, thereby implementing service continuity.

The service flow is allowed to access the first LADN DNN but is not allowed to access the second LADN DNN. When the terminal moves out of an available area of the first LADN DNN, and the target area is a service area of a DNN of the second LADN or a non-LADN, the domain name address record of the first service flow is refreshed, so that a server (for example, a public network server) in the non-LADN can be accessed, thereby implementing service continuity.

For the service flow allowing access to the second LADN DNN, when the terminal moves into the service area of the second LADN, the domain name address record of the first service flow is refreshed, so that a local server in the second LADN can be accessed, thereby implementing service continuity.

In an implementation, the service flow may be an application or a domain name. For example, a browser includes a plurality of domain names, MEC is deployed for only some domain names, and a corresponding local server exists.

In an implementation, only a service flow (for example, an application or a domain name) that supports a local service has a local server, and the local server changes with a location of the terminal. For an application of a non-local service, a domain name address record of the application may not be refreshed as the terminal moves. Because a server of the application is not local, no change occurs as the terminal moves. Repeated query may cause unnecessary resource overheads. Therefore, resource overheads can be reduced by refreshing only a domain name address record of a specific application or a specific domain name.

In an implementation, that the first processing module 1601 performs a related operation of refreshing a domain name address record may include at least one of the following:

(1) initiating domain name query based on a domain name in a stored domain name address record;
(2) updating the stored domain name address record based on a domain name query result;
(3) generating location-based domain name query information based on the domain name and location information; or
(4) requesting domain name query based on the location-based domain name query information.

In an implementation, the location-based domain name query information may include one of the following: a location-based domain name, a domain name, and location information. In an implementation, the location-based domain name query information may be included in an HTTP request to request domain name query.

Optionally, the location information may include at least one of the following: (a) current location information of the terminal or (b) area information of the second area.

In an implementation, the second area includes a plurality of areas (for example, a plurality of TAs), and a current location of the terminal is only one area (for example, one TA). In the second area, the address of the local server of the service flow remains unchanged, and query may be performed in the second area. Alternatively, query may be performed based on a current area of the terminal. The second area may be a service area of the second LADN.

Optionally, area information of the service area of the local service may include at least one of the following:

(1) a TA identifier (for example, a TAC or a TAI);
(2) an identifier of a RAN network element;
(3) an identifier of a cell; or
(4) a DNN (for example, a DNN of an LADN).

Optionally, the current location information of the terminal may include at least one of the following:

(1) an identifier of a TA in which the terminal is located;
(2) an identifier of a RAN network element of the terminal;
(3) an identifier of a cell on which the terminal camps; or
(4) a DNN accessed by the terminal.

It is not difficult to understand that when the terminal moves out of an area of a first local service, and enters an area of a non-local service or an area of a second local service, a domain name query result obtained in the area of the first local service is invalid. Either the terminal is rejected by a local server of the first local service, or a delay cannot meet a service requirement. In this case, the service flow may not initiate domain name query. At this time, the terminal may initiate domain name query again instead of an application, and update the domain name query result based on a query result. In this way, service continuity is supported.

The first communications device provided in this embodiment of the present disclosure may perform the foregoing method embodiment shown in FIG. 3. An implementation principle and a technical effect of the communications device are similar to those of the method embodiment, and details are not described herein again in this embodiment.

Figure 17:
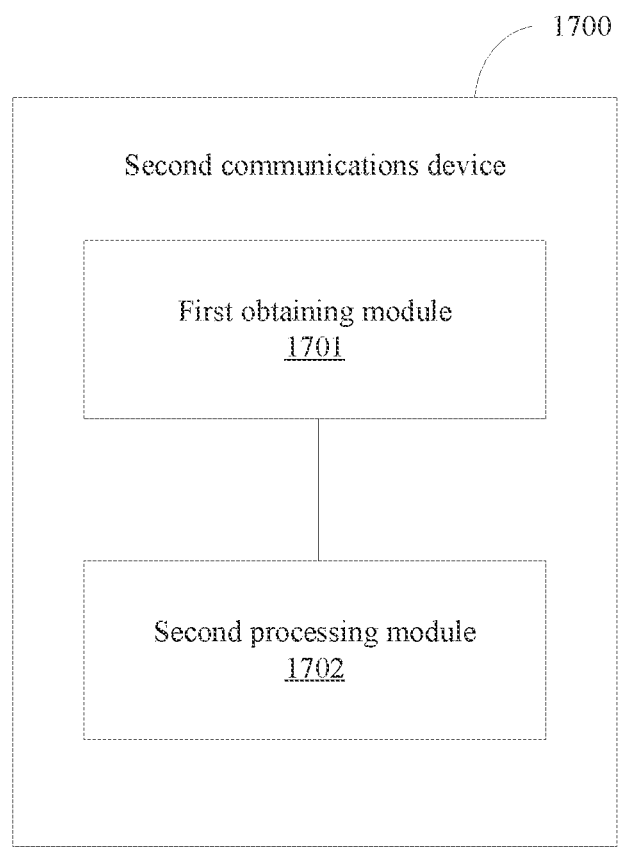
FIG. 17 is a second schematic diagram of a second communications device according to an embodiment of the present disclosure.

Referring to FIG. 17, an embodiment of the present disclosure further provides a second communications device, and the second communications device 1700 includes:

a first obtaining module 1701, configured to obtain first information, where the first information includes at least one of the following: an address of a first DNS or a first indication, where the first indication is used to instruct to trigger domain name address query; and a second processing module 1702, configured to perform a first operation based on the first information.

In an implementation, when the first information includes the address of the first DNS and/or the first indication, the second processing module 1702 performs one or more of the following:

(1) replacing an address of a second DNS with the address of the first DNS;
(2) deleting a domain name address record queried by using the address of the second DNS;
(3) re-querying, by using the address of the first DNS, a domain name queried by using the address of the second DNS; and
(4) querying a domain name in the domain name address record by using the address of the first DNS.

The second DNS is a DNS obtained before the step of obtaining the first information.

In another implementation, when the first information includes the first indication, the second processing module 1402 performs one or more of the following:

(1) deleting a domain name address record queried by using the address of the second DNS; and
(2) initiating domain name query for the domain name in the domain name address record.

In an implementation, the second DNS is a local DNS, and the first DNS is another local DNS. As the terminal moves, the terminal moves from a service area (edge cloud) of one local service to a service area (for example, another edge cloud) of another local service. When the local DNS changes, a previously queried domain name record is queried again, and a service address corresponding to a previous domain name is replaced. It is not difficult to understand that an address of a target edge server can be obtained.

In another implementation, the second DNS is a local DNS, and the first DNS is a non-local DNS. As the terminal moves, the terminal moves out of a service area (edge cloud) of a local service, and the local DNS is deleted. An address of a server on a public network needs to be queried through a public DNS. When an address of a DNS changes, a previously queried domain name record is queried again, and the previous domain name record is replaced.

In another implementation, the second DNS is a non-local DNS, and the first DNS is a local DNS. As the terminal moves, the terminal moves to a service area (for example, an edge cloud) of a local service. An address of a server on a public network needs to be queried through a local DNS. When an address of a DNS changes, a previously queried domain name record is queried again, and the previous domain name record is replaced.

The second communications device provided in this embodiment of the present disclosure may perform the foregoing method embodiment shown in FIG. 4. An implementation principle and a technical effect of the communications device are similar to those of the method embodiment, and details are not described herein again in this embodiment.

Figure 18:
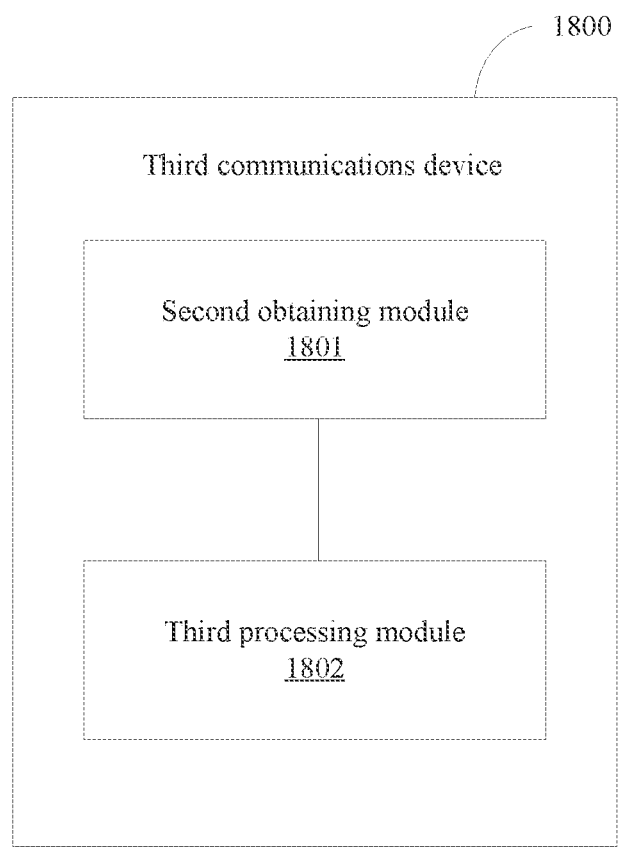
FIG. 18 is a third schematic diagram of a third communications device according to an embodiment of the present disclosure.

Referring to FIG. 18, an embodiment of the present disclosure further provides a third communications device, and the third communications device 1800 includes:
- a second obtaining module 1801, configured to obtain location information of a terminal; and
- a third processing module 1802, configured to determine first information and/or update DNS information of the terminal based on the location information of the terminal, where the first information includes at least one of the following: an address of a first DNS or a first indication, where the first indication is used to instruct to trigger domain name address query.

The first information may include at least one of the following: (1) an address of a first DNS or (2) a first indication, where the first indication is used to instruct to trigger domain name address query. The first DNS may be a local DNS or a non-local DNS.

The first DNS may be a first local DNS or a non-local DNS.

The second DNS may be a second local DNS or a non-local DNS.

In an implementation, as the terminal moves, the terminal moves from a service area (edge cloud) of a second local service to a service area (for example, another edge cloud) of a first local service, a DNS of the first local service may be configured for the terminal, where the first DNS may be a DNS of the first local service, and the second DNS may be a DNS of the second local service.

In an implementation, as the terminal moves, the terminal moves from a service area (edge cloud) of a second local service to a service area (for example, another edge cloud) of a non-local service, a DNS of the non-local service may be configured for the terminal, where the first DNS may be a DNS of the non-local service, and the second DNS may be a DNS of the second local service.

In an implementation, as the terminal moves, the terminal moves from a service area (edge cloud) of a non-local service to a service area (for example, another edge cloud) of a first local service, a DNS of the first local service may be configured for the terminal, where the first DNS may be a DNS of the first local service, and the second DNS may be a DNS of the non-local service.

Optionally, the DNS type may include at least one of the following: a local DNS or a non-local DNS.

The local DNS may further include one of the following: an MEC DNS and an LADN DNS. The non-local DNS may further include one of the following: a non-MEC DNS, a non-LADN DNS, or a public DNS.

Optionally, the location information of the terminal may include at least one of the following:
(1) a TA;
(2) an identifier of a RAN network element;
(3) an identifier of a cell; or
(4) a DNN of an LADN.

In an implementation, the third processing module 1802 is further configured to send the first information to the terminal.

The third communications device provided in this embodiment of the present disclosure may perform the foregoing method embodiment shown in FIG. 5. An implementation principle and a technical effect of the communications device are similar to those of the method embodiment, and details are not described herein again in this embodiment.

Figure 19:
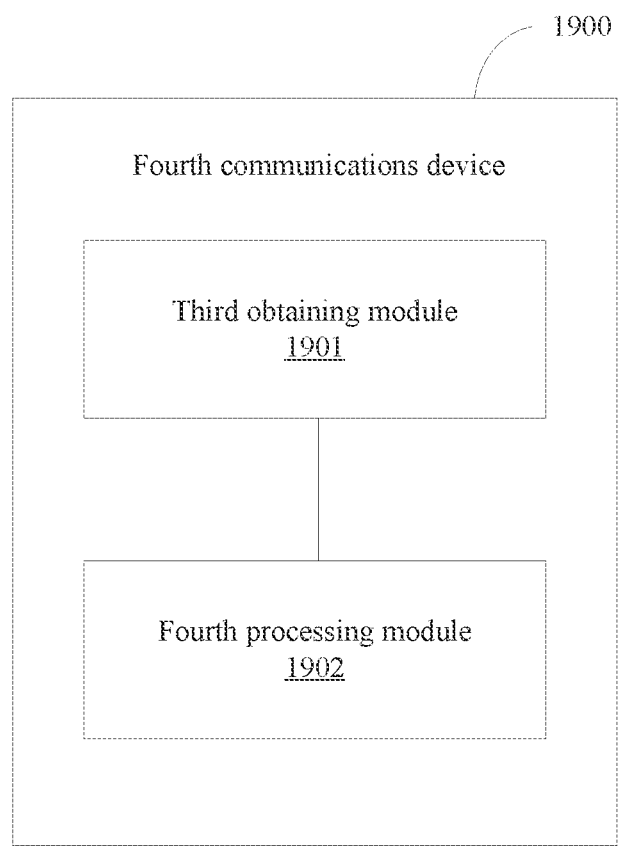
FIG. 19 is a fourth schematic diagram of a fourth communications device according to an embodiment of the present disclosure.

Referring to FIG. 19, an embodiment of the present disclosure further provides a fourth communications device, and the fourth communications device 1900 includes:
- a third obtaining module 1901, configured to obtain second information; and
- a fourth processing module 1902, configured to determine, based on the second information, a DNS queried by using a domain name, where
- the second information may include at least one of the following: (1) DNS information, (2) description information of a service flow using a first DNS, (3) description information of a service flow using a second DNS, (4) description information of a service flow using a local DNS, (5) description information of a service flow using a non-local DNS, (6) an address of a DNS of a service flow, or (7) a DNS type of the DNS of the service flow.

Optionally, the DNS information includes at least one of the following: an address of a local DNS or an address of a non-local DNS; or the DNS information includes at least one of the following: an address of the first DNS, an address of the second DNS, a DNS type of the first DNS, or a DNS type of the second DNS.

Optionally, the DNS type includes at least one of the following: a local DNS or a non-local DNS. The local DNS may further include one of the following: an MEC DNS and an LADN DNS. The non-local DNS may further include one of the following: a non-MEC DNS, a non-LADN DNS, and a public DNS.

In an implementation, the DNS information is obtained by using a PCO or an ePCO.

Optionally, the fourth processing module 1902 is further configured to perform the following implementations:
- manner 1: In a case that a first condition is met, it is determined that a DNS queried by using a domain name of a service flow is the first DNS. The first condition may include at least one of the following: (1) a DNS type of the service flow being a local DNS, (2) a first DNS type being a local DNS, or (3) the service flow (for example, an application) triggering domain name address query.

Manner 2: In a case that a second condition is met, it is determined that an address of a DNS queried by using a domain name of a service flow is the second DNS. The second condition may include at least one of the following: (1) the DNS type of the service flow is a non-local DNS, (2) the second DNS is a non-local DNS, or (3) the service flow triggers domain name address query.

Manner 3: In a case that a third condition is met, it is determined that a DNS queried by using a domain name of a service flow is a local DNS, where the third condition may include at least one of the following: (1) the DNS type of the service flow is local DNS, or (2) the service flow triggers domain name address query.

Manner 4: In a case that a fourth condition is met, it is determined that an address of a DNS queried by using a domain name of a service flow is a non-local DNS, where
    the fourth condition may include at least one of the following: (1) the DNS type of the service flow is a non-local DNS, or (2) the service flow triggers domain name address query.

The fourth communications device provided in this embodiment of the present disclosure may perform the foregoing method embodiment shown in FIG. 7. An implementation principle and a technical effect of the communications device are similar to those of the method embodiment, and details are not described herein again in this embodiment.

Figure 20:
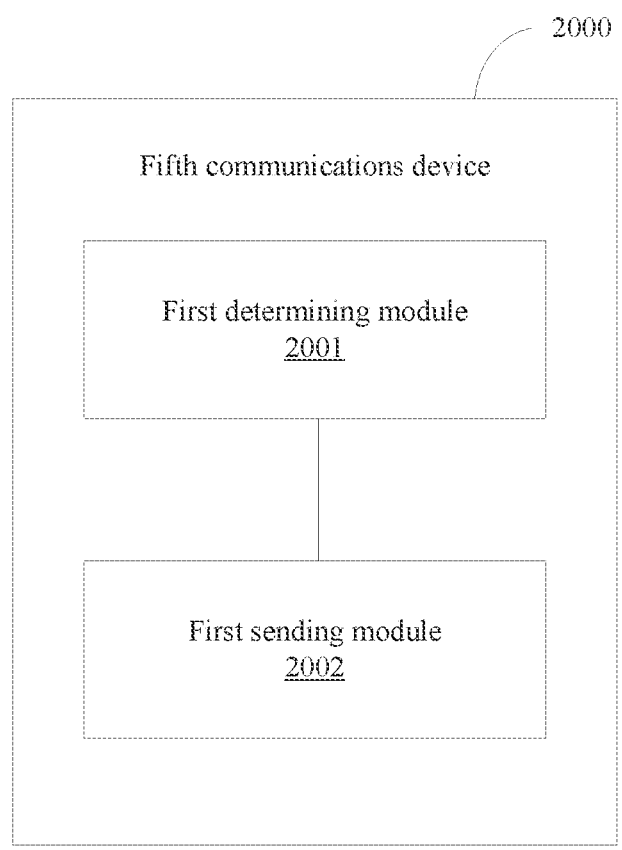
FIG. 20 is a fifth schematic diagram of a fifth communications device according to an embodiment of the present disclosure.

Referring to FIG. 20, an embodiment of the present disclosure further provides a fifth communications device, and the fifth communications device 2000 includes:
    a first determining module 2001, configured to determine second information and/or third information; and
    a second determining module 2002, configured to send the second information and/or the third information, where
    the second information may include at least one of the following: (1) DNS information, (2) description information of a service flow using a first DNS, (3) description information of a service flow using a second DNS, (4) description information of a service flow using a local DNS, (5) description information of a service flow using a non-local DNS, (6) an address of a DNS of a service flow, or (7) a DNS type of the DNS of the service flow; and
    the third information includes at least one of the following: (1) an address of a second local DNS; (2) a second indication, where the second indication is used to instruct to delete an address of a first local DNS; (3) a third indication, where the third indication is used to instruct to trigger domain name address query; or (4) an address of a third DNS.

Optionally, the DNS information includes at least one of the following: (a) an address of a local DNS or (b) an address of a non-local DNS; or the DNS information includes at least one of the following: (a) an address of the first DNS, (b) an address of the second DNS, (c) a DNS type of the first DNS, or (d) a DNS type of the second DNS.

Optionally, the DNS type includes at least one of the following: a local DNS or a non-local DNS.

The local DNS may further include one of the following: an MEC DNS and an LADN DNS. The non-local DNS may further include one of the following: a non-MEC DNS, a non-LADN DNS, and a public DNS.

Optionally, the location information of the terminal includes at least one of the following: (1) a TA, (2) an identifier of a RAN network element, (3) an identifier of a cell, or (4) a DNN.

In an implementation, the first determining module 2001 is further configured to determine different local DNSs based on a location of the terminal. When the location changes, the first local DNS may change to the second local DNS or a non-local DNS.

In an implementation, content (1) to (7) in the second information may not be simultaneously sent.

In an implementation, the first sending module 2002 sends the second information (for example, the DNS information) by using a PCO or an ePCO.

In another implementation, the first sending module 2002 sends the second information by using a URSP.

The fifth communications device provided in this embodiment of the present disclosure may perform the foregoing method embodiment shown in FIG. 8. An implementation principle and a technical effect of the communications device are similar to those of the method embodiment, and details are not described herein again in this embodiment.

Figure 21:
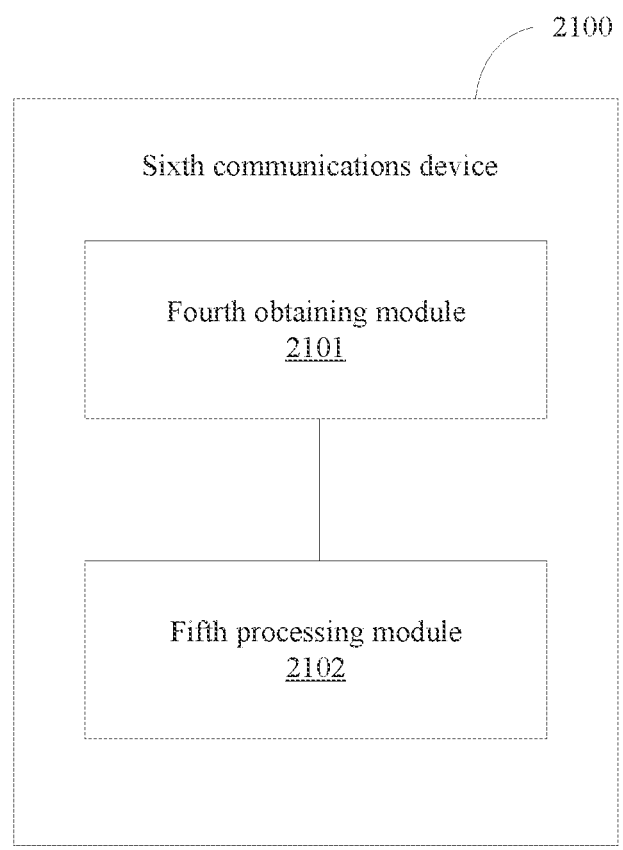
FIG. 21 is a sixth schematic diagram of a sixth communications device according to an embodiment of the present disclosure.

Referring to FIG. 21, an embodiment of the present disclosure further provides a sixth communications device, and the sixth communications device 2100 includes:
    a fourth obtaining module 2101, configured to obtain third information, where the third information includes at least one of the following: (1) an address of a second local DNS; (2) a second indication, where the second indication is used to instruct to delete an address of a first local DNS; (3) a third indication, where the third indication is used to instruct to trigger domain name address query; or (4) an address of a third DNS; and
    a fifth processing module 2102, configured to perform a second operation based on the third information.

In an implementation, the fifth processing module 2102 is further configured to: when the third information includes the address of the second DNS and/or the third indication, perform one or more of the following:
    (1) replacing the address of the first local DNS with the address of the second local DNS;
    (2) querying a domain name related to a first service flow (for example, an application) from the second local DNS, where optionally, the first service flow is a service flow whose DNS type is a local DNS, or a service flow whose domain name is queried by using the first local DNS;
    (3) deleting a domain name address record queried by using the first local DNS;
    (4) querying, by using the second local DNS, a domain name queried by using the first local DNS.

In another implementation, the fifth processing module 2102 is further configured to: when the third information includes the second indication and/or the third indication, perform one or more of the following:
    (1) deleting the address of the first local DNS or an address of a first DNS;
    (2) querying a domain name related to a first service flow from a non-local DNS;
    (3) deleting a domain name address record queried by using the first local DNS;
    (4) querying, by using the non-local DNS, a domain name queried by using the first local DNS;
    (5) querying the domain name related to the first service flow from a second DNS;
    (6) deleting a domain name address record queried by using the first DNS; and
    (7) querying, by using the second DNS, a domain name queried by using the first DNS, where the first service flow is a service flow whose DNS type is local DNS or a service flow whose domain name is queried by using the first DNS.

In another implementation, the fifth processing module 2102 is further configured to: when the third information includes the address of the third DNS and/or the third indication, perform one or more of the following:
    (1) replacing an address of a first DNS with the address of the third DNS;
    (2) querying a domain name related to a first service flow from the third DNS;

(3) deleting a domain name address record queried by using the first DNS; and (4) querying, by using the third DNS, a domain name queried by using the first DNS, where the first service flow is a service flow whose DNS type is local DNS or an application whose domain name has been queried by using the first DNS.

In an implementation, as the terminal moves, the terminal moves from a service area (edge cloud) of one local service to a service area (edge cloud) of another local service. When the local DNS changes, a previously queried domain name record is queried again, and a service address corresponding to a previous domain name is replaced. It is not difficult to understand that an address of a target edge server can be obtained.

In another implementation, the non-local DNS is a public DNS. As the terminal moves, the terminal moves out of a service area (edge cloud) of a local service, and the local DNS is deleted. An address of a server on a public network needs to be queried through a public DNS. When an address of a DNS changes, a previously queried domain name record is queried again, and the previous domain name record is replaced.

The sixth communications device provided in this embodiment of the present disclosure may perform the foregoing method embodiment shown in FIG. 10. An implementation principle and a technical effect of the communications device are similar to those of the method embodiment, and details are not described herein again in this embodiment.

Figure 22:
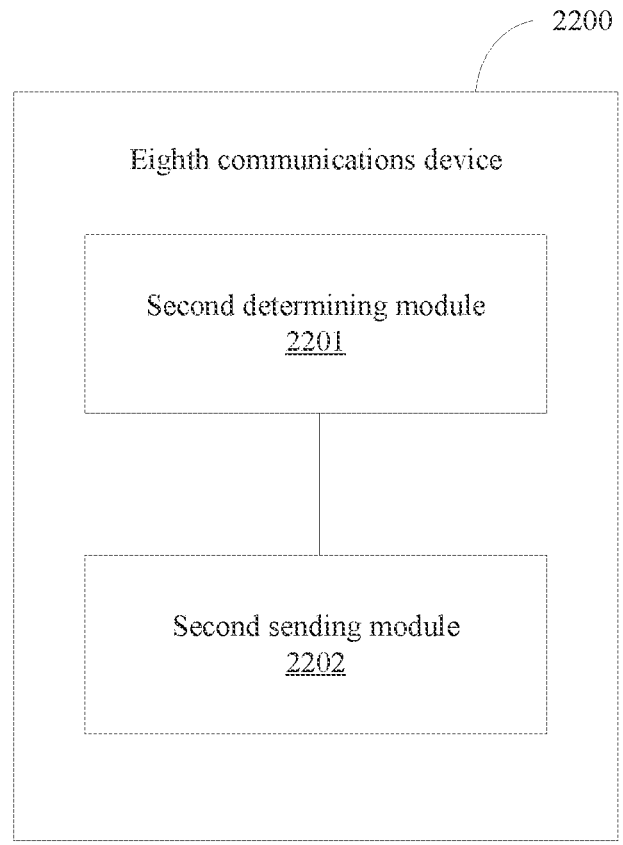
FIG. 22 is a seventh schematic diagram of an eighth communications device according to an embodiment of the present disclosure.

Referring to FIG. 22, an embodiment of the present disclosure further provides an eighth communications device, and the eighth communications device 2200 includes:

a second determining module 2201, configured to determine information of an edge service; and a second sending module 2202, configured to send the information of the edge service, where the information of the edge service includes at least one of the following: information of an LADN or a terminal policy related to a service flow.

A terminal that subscribes to an edge service (for example, an MEC) may be implemented by subscribing to one or more LADNs. The LADN is an LADN in the edge service.

Optionally, the operation of determining information of an edge service includes at least one of the following:

(1) determining information of an LADN in the edge service; or (2) determining a terminal policy related to a service flow for which the edge service is allowed or deployed.

The operation of determining a terminal policy (for example, a URSP) related to a service flow for which the edge service is allowed or deployed includes at least one of the following:

(1) configuring one or more route selection rules (for example, UE Route Selection Policy Rule in URSP) for the service flow, where each route selection rule includes one DNN; or (2) configuring one or more LADN (which may be an LADN in the edge service) DNNs and/or one non-LADN DNN (or referred to as a public DNN) for the service flow.

Optionally, when a route selection rule of the service flow includes a non-LADN DNN, a priority of the route selection rule corresponding to the non-LADN DNN (or referred to as a public DNN) is lowest in all route selection rules of the service flow, or is lower than a priority of a route selection rule corresponding to an LADN DNN.

It is not difficult to understand that, by means of such configuration, the terminal preferentially accesses the LADN DNN, and the service flow also selects a local server corresponding to the LADN. Only when the terminal moves out of service areas of all available LADNs or service areas of all available local servers, the terminal selects a non-LADN DNN (or referred to as a public DNN), and the service flow chooses to access a non-local server.

Optionally, the second sending module 2202 sends the information of the edge service to the terminal.

The eighth communications device provided in this embodiment of the present disclosure may perform the foregoing method embodiment shown in FIG. 12. An implementation principle and a technical effect of the communications device are similar to those of the method embodiment, and details are not described herein again in this embodiment.

Figure 23:
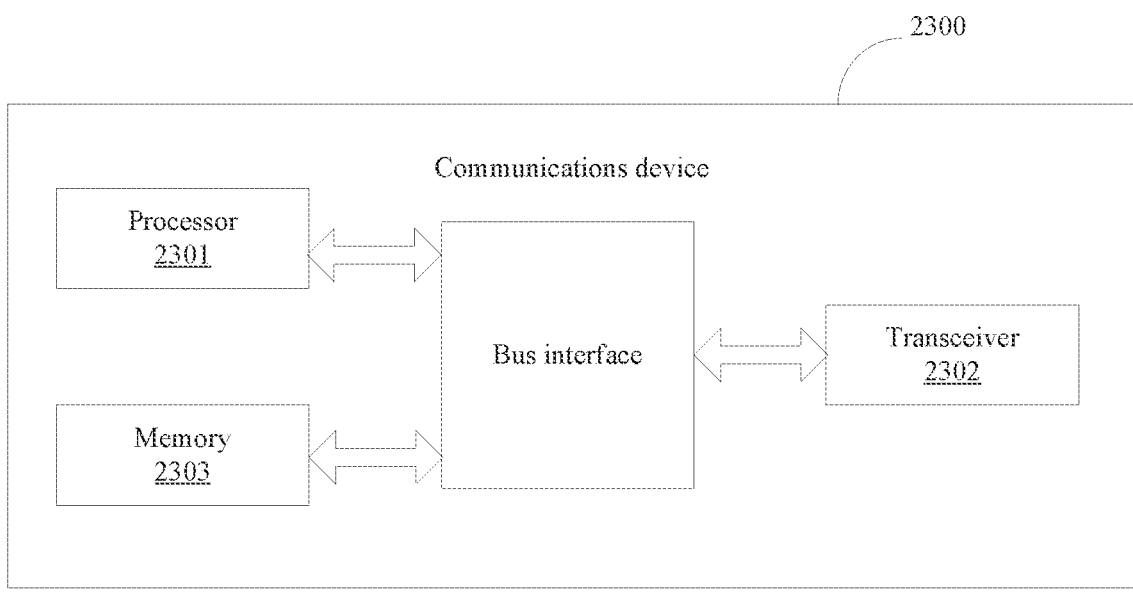
FIG. 23 is a schematic diagram of a communications device according to an embodiment of the present disclosure.

Referring to FIG. 23, FIG. 23 is a structural diagram of a communications device to which embodiments of the present disclosure are applied. As shown in FIG. 23, the communications device 2300 includes a processor 2301, a transceiver 2302, a memory 2303, and a bus interface. The processor 2301 may be responsible for managing a bus architecture and normal processing. The memory 2303 may store data used by the processor 2301 when the processor 2301 performs an operation.

In an embodiment of the present disclosure, the communications device 2300 further includes a computer program that is stored in the memory 2303 and executable on the processor 2301, and when the computer program is executed by the processor 2301, the foregoing steps shown in FIG. 3 to FIG. 13 are implemented.

In FIG. 23, a bus architecture may include any quantity of interconnected buses and bridges. For example, various circuits of one or more processors represented by the processor 2301 and a memory represented by the memory 2303 are interconnected. The bus architecture may further link various other circuits such as a peripheral device, a voltage regulator, and a power management circuit. These are well known in the art, and therefore are not further described in this specification. A bus interface provides an interface. The transceiver 2302 may be a plurality of components. To be specific, the transceiver 2302 includes a transmitter and a receiver, and provides a unit configured to communicate with various other apparatuses on a transmission medium.

The communications device provided in this embodiment of the present disclosure may perform the foregoing method embodiments shown in FIG. 3 to FIG. 13. An implementation principle and a technical effect of the communications device are similar to those of the method embodiments, and details are not described herein again in this embodiment.

Method or algorithm steps described in combination with the content disclosed in the present disclosure may be implemented by hardware, or may be implemented by a processor by executing a software instruction. The software instruction may include a corresponding software module. The software module may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disc read only memory, or any other form of non-transitory computer-readable storage medium well-known in the art. For example, a non-transitory computer-readable storage medium is coupled to the processor, so that the processor can read information from the non-transitory computer-readable storage medium or write information into the non-transitory computer-readable storage medium. Certainly, the non-transitory computer-readable storage medium may be a component of the processor. The processor and the non-transitory computer-readable storage medium may be carried in an application specific integrated circuit (ASIC). In addition, the ASIC may be carried in a core network interface device. Certainly, the processor and the non-transitory computer-readable storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, improvement, or the like based on the technical solutions of the present disclosure shall fall within the protection scope of the present disclosure.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. Moreover, the embodiments of the present disclosure may use a form of a computer program product that is implemented on one or more computer-usable storage media (including but not limited to a magnetic disk memory, a CD-ROM, an optical memory, and the like) that include computer-usable program code.

The embodiments of the present disclosure are described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of the present disclosure without departing from the spirit and scope of the present disclosure. In this way, the present disclosure is intended to include these modifications and variations of the embodiments of the present disclosure provided that they fall within the scope of the claims of the present disclosure and their equivalent technologies.

What is claimed is:

1. A domain name address obtaining method, applied to a first communications device and comprising:
    in a case that a first condition is met, performing a related operation of refreshing a domain name address record to obtain an address of a second server, wherein the second server is an edge server or public server used to exchange data with the first communications device, and the first condition comprises:
    a first indication being received in a protocol data unit (PDU) session modification process, wherein the first indication is used to instruct to trigger domain name address query; wherein
    the domain name address record is a mapping relationship between a server domain name and a server address.

2. The method according to claim 1, wherein the first condition further comprises at least one of:
    confirming that an obtained domain name system (DNS) address is changed;
    occurring a PDU session relocation;
    confirming that an obtained internet protocol (IP) address is changed;
    a first data network name (DNN) being no longer available;
    a second DNN being available;
    a terminal moving from a first area to a second area;
    a terminal moving out of the first area;
    a terminal moving to the second area; or
    a terminal being in a connected state; and
    the first area comprises at least one of: a serving area of a first local service, a serving area of a non-local service, or an available area of the first DNN; and
    the second area comprises at least one of: a serving area of a second local service, a serving area of a non-local service, or an available area of the second DNN.

3. The method according to claim 1, wherein the domain name address record is a domain name query record of a first service flow; and
    the first service flow comprises at least one of:
    a service flow supporting a local service; or
    a service flow allowing access to a local area data network data network name (LADN) DNN.

4. The method according to claim 3, wherein the service flow allowing access to the LADN DNN comprises at least one of:
- a service flow allowing access to a first LADN DNN; or
- a service flow allowing access to a second LADN DNN, wherein
- the first LADN DNN is a DNN in a first LADN; and
- the second LADN DNN is a DNN in a second LADN.

5. The method according to claim 1, wherein the performing a related operation of refreshing a domain name address record comprises at least one of:
- initiating domain name query based on a domain name in a stored domain name address record;
- updating the stored domain name address record based on a domain name query result;
- generating location-based domain name query information based on a domain name and location information; or
- performing domain name query based on the location-based domain name query information.

6. The method according to claim 1, wherein the address of a second server is an IP address of the second server.

7. The method according to claim 1, wherein the first communications device comprises a terminal.

8. A domain name address obtaining method, applied to a third communications device and comprising:
- obtaining location information of a terminal;
- determining and/or updating domain name system (DNS) information of the terminal based on the location information of the terminal; and
- sending first information comprising a first indication to the terminal, so as to cause the terminal to perform a related operation of refreshing a domain name address record to obtain an address of a second server in a case that the terminal receives the first indication in a protocol data unit (PDU) session modification process; wherein
- the first indication is used to instruct to trigger domain name address query.

9. The method according to claim 8, wherein
the DNS information comprises at least one of: an address of a local DNS or an address of a non-local DNS; or the DNS information comprises at least one of: an address of the first DNS, an address of the second DNS, a DNS type of the first DNS, or a DNS type of the second DNS.

10. The method according to claim 9, wherein
the DNS type comprises at least one of: a local DNS or a non-local DNS.

11. The method according to claim 10, wherein the first information is used to instruct the second communications device to perform one or more of following:
- replacing an address of a second DNS with the address of the first DNS;
- deleting a domain name address record queried by using the address of the second DNS;
- re-querying, by using the address of the first DNS, a domain name queried by using the address of the second DNS; and
- querying a domain name in the domain name address record by using the address of the first DNS.

12. The method according to claim 8, wherein the first information further comprises an address of a first DNS; wherein
the first DNS is a local DNS.

13. A communications device, wherein the communications device is a first communications device, which comprises a processor, a memory, and a program that is stored in the memory and executable on the processor, wherein the program, when executed by the processor, causes the first communications device to perform:
- in a case that a first condition is met, performing a related operation of refreshing a domain name address record to obtain an address of a second server, wherein the second server is an edge server or public server used to exchange data with the first communications device, and the first condition comprises:
  - a first indication being received in a protocol data unit (PDU) session modification process, wherein the first indication is used to instruct to trigger domain name address query; wherein
- the domain name address record is a mapping relationship between a server domain name and a server address.

14. The communications device according to claim 13, wherein the first condition further comprises at least one of:
- confirming that an obtained domain name system (DNS) address is changed;
- occurring a protocol data unit (PDU) session relocation;
- confirming that an obtained internet protocol (IP) address is changed;
- a first data network name (DNN) being no longer available;
- a second DNN being available;
- a terminal moving from a first area to a second area;
- a terminal moving out of the first area;
- a terminal moving to the second area; or
- a terminal being in a connected state; and
- the first area comprises at least one of: a serving area of a first local service, a serving area of a non-local service, or an available area of the first DNN; and
- the second area comprises at least one of: a serving area of a second local service, a serving area of a non-local service, or an available area of the second DNN.

15. The communications device according to claim 13, wherein the domain name address record is a domain name query record of a first service flow; and
the first service flow comprises at least one of:
- a service flow supporting a local service; or
- a service flow allowing access to a local area data network data network name (LADN) DNN.

16. The communications device according to claim 15, wherein the service flow allowing access to the LADN DNN comprises at least one of:
- a service flow allowing access to a first LADN DNN; or
- a service flow allowing access to a second LADN DNN, wherein
- the first LADN DNN is a DNN in a first LADN; and
- the second LADN DNN is a DNN in a second LADN.

17. The communications device according to claim 13, wherein the program, when executed by the processor, causes the first communications device to perform at least one of:
- initiating domain name query based on a domain name in a stored domain name address record;
- updating the stored domain name address record based on a domain name query result;
- generating location-based domain name query information based on a domain name and location information; or
- performing domain name query based on the location-based domain name query information.

18. The communications device according to claim 13, wherein the address of a second server is an IP address of the second server.

19. The communications device according to claim 13, wherein the first communications device comprises a terminal.

20. A communications device, wherein the communications device is a third communications device, which comprises a processor, a memory, and a program that is stored in the memory and executable on the processor, wherein when the program is executed by the processor, steps of the domain name address obtaining method according to claim 8 are implemented.

\* \* \* \* \*